US005798435A

United States Patent [19]
Gruber et al.

[11] Patent Number: 5,798,435
[45] Date of Patent: *Aug. 25, 1998

[54] VISCOSITY-MODIFIED LACTIDE POLYMER COMPOSITION AND PROCESS FOR MANUFACTURE THEREOF

[75] Inventors: Patrick Richard Gruber, St. Paul; Jeffrey John Kolstad, Wayzata; David Roy Witzke, Minneapolis; Mark Henry Hartmann, Minnetonka; Andrea Lee Brosch, Eden Prairie, all of Minn.

[73] Assignee: Cargill, Incorporated, Minneapolis, Minn.

[*] Notice: The term of this patent shall not extend beyond the expiration date of Pat. No. 5,359,026.

[21] Appl. No.: 707,245

[22] Filed: Sep. 3, 1996

Related U.S. Application Data

[63] Continuation of Ser. No. 279,732, Jul. 27, 1994, Pat. No. 5,594,095, which is a continuation-in-part of Ser. No. 100,550, Jul. 30, 1993, Pat. No. 5,359,026.

[51] Int. Cl.$^6$ .................................................. C08G 63/08
[52] U.S. Cl. .......................... 528/354; 528/357; 528/361
[58] Field of Search ................................ 528/354, 357, 528/361

[56] References Cited

U.S. PATENT DOCUMENTS

| 3,072,680 | 1/1963 | Starcher et al. | 549/260 |
|---|---|---|---|
| 4,175,177 | 11/1979 | Potts | 528/354 |
| 4,195,167 | 3/1980 | Knopf et al. | 528/468 |
| 4,379,138 | 4/1983 | Pitt et al. | 528/354 |
| 4,644,038 | 2/1987 | Protzman | 525/412 |
| 5,080,665 | 1/1992 | Jarrett et al. | 528/354 |
| 5,142,023 | 8/1992 | Gruber et al. | 528/354 |
| 5,180,765 | 1/1993 | Sinclair | 528/354 |
| 5,216,043 | 6/1993 | Sipinen et al. | 528/354 |
| 5,216,050 | 6/1993 | Sinclair | 528/354 |
| 5,225,521 | 7/1993 | Spinu | 523/126 |
| 5,247,058 | 9/1993 | Gruber et al. | 528/354 |
| 5,247,059 | 9/1993 | Gruber et al. | 538/354 |
| 5,252,642 | 10/1993 | Sinclair et al. | 528/354 |
| 5,302,694 | 4/1994 | Buchholz | 528/354 |
| 5,338,822 | 8/1994 | Gruber et al. | 528/354 |
| 5,346,966 | 9/1994 | Spinu | 528/354 |
| 5,359,026 | 10/1994 | Gruber et al. | 528/354 |
| 5,424,346 | 6/1995 | Sinclair | 528/354 |
| 5,444,113 | 8/1995 | Sinclair et al. | 528/354 |
| 5,475,080 | 12/1995 | Gruber et al. | 528/354 |
| 5,484,881 | 1/1996 | Gruber et al. | 528/354 |
| 5,502,158 | 3/1996 | Sinclair et al. | 528/354 |
| 5,525,671 | 6/1996 | Ebato et al. | 528/354 |
| 5,525,706 | 6/1996 | Gruber et al. | 528/354 |
| 5,539,081 | 7/1996 | Gruber et al. | 528/354 |
| 5,543,494 | 8/1996 | Perego et al. | 528/354 |

FOREIGN PATENT DOCUMENTS

| 0 272 902 | 6/1988 | European Pat. Off. . |
|---|---|---|
| 0 469 520 | 2/1992 | European Pat. Off. . |
| 0593271 | 4/1994 | European Pat. Off. . |
| WO 90/01521 | 2/1990 | WIPO . |
| WO 92/04413 | 3/1992 | WIPO . |
| WO 93/02075 | 2/1993 | WIPO . |
| WO 94/06856 | 3/1994 | WIPO . |
| WO 9518169 | 7/1995 | WIPO . |

OTHER PUBLICATIONS

Pitt et al., "The Synthesis of Biodegradable Polymers with Functional Side Chains", J. Polymer Science: Part A: Polymer Chemistry, 25:955–966 (1987).

Schaefgen et al., "Synthesis of Multichain Polymers and Investigation of their Viscosities", J. Am. Chem., 70, 2709–=2718 (1948).

Schindler et al., "Aliphatic Polyesters. III. Molecular Weight and Molecular Weight Distribution in Alcohol–Initiated Polymerizations of ε–Caprolactone", J. Polymer Science: Polymer Chemistry Edition, 20:319–326 (1982).

Storey et al., "Degradable Polyurethane Networks Bsed on D,L–lactide, glycolide, ε–caprolactone and Trimethylene Carbonate Homopolyester and Copolyester Triols", Polymer, 35:830–838 (1994).

Tian et al., "Macromolecular Engineering of Polylactones and Polylactides. 18. Synthesis of Star–Branched Alipatic Polyesters Bearing Various Functional End Groups", Macromolecules, 27:4134–4144 (1994).

Grijpma et al., "Poly(L–lactide) crosslinked with spiro–bis––dimethylene–carbonate", Mcromol. Chem. Phys. 195, pp. 1633–1647 (1994).

Grijpma et al., "(Co)polymers of L–lactide, 1 Synthesis, thermal properties and hydrolytic degaradation", Polymer 34:1496–1503 (1993).

A. Sodergard & J.H. Nasman, "Stabilization of poly(l–lactide) in the melt", Dept. of Polymer Technology, Abo Akademi University, Porthansgatan 3–5, 20500 Turku, Finland (1994).

Anders Sodergarrd et al., "Changes in Peroxide Melt–Modified Poly(L–lactide)", Ind. Eng. Chem. Res. 34:1203–1207 (1995).

International Search Report for PCT/US94/08508.

Bruin et al., "Design and Synthesis of Biodegradable Poly(ester–urethane) Elastomer Networks Composed of Non––toxic Building Blocks", Markomol. Chem., Rapid. Commun., 9:589–594 (1988).

Grijpma et al., "Star–shaped Polylactide–containing Block Copolymers", Markomol. Chem., Rapid Commun., 14:155–161 (1993).

Kim et al., "Multifunctional Initiation of Lactide Polymerization by Stannous Octoate/Pentaerythritol", Macromol. Chem., 193:1623–1631 (1992).

Manaresi et al., "Synthesis and Characterization of Linear and Star–Branched Poly(ε–caprolactone)", La Chimica & L'Industria, 72:131–134 (1990).

Primary Examiner—P. Hampton-Hightower
Attorney, Agent, or Firm—Merchant, Gould, Smith, Edell, Welter & Schmidt, P.A.

[57] ABSTRACT

A composition comprising a polylactide polymer with improved extensional viscosity and methods of making the same are disclosed. The polylactide polymer composition is prepared by providing in the composition polylactide polymer molecules which have been modified, relative to linear non-substituted polylactide, to provide increased molecular interaction among polylactide backbone chains in the composition. The preferred polylactide polymer composition has a number average molecular weight of at least about 10,000 (preferably at least 50,000) and a polydispersity of at least about 2.5. In addition, the polylactide polymer composition should have a neck-in ratio of less than about 0.8

28 Claims, 4 Drawing Sheets .

VISCOSITY-MODIFIED LACTIDE POLYMER COMPOSITION AND PROCESS FOR MANUFACTURE THEREOF

CROSS-REFERENCE TO RELATED APPLICATIONS

The present application is a continuation of U.S. application Ser. No. 08/279,732 which was filed on Jul. 27, 1994, and which issued as U.S. Pat. No. 5,594,095 on Jan. 14, 1997. U.S. application Ser No. 08/279,732 is a continuation-in-part of U.S. application Ser. No. 08/100,550 which was filed on Jul. 30, 1993 and which issued as U.S. Pat. No. 5,359,026 on Oct. 25, 1994. The disclosures of U.S. application Ser. Nos. 08/100,550 and 08/279,732 are hereby incorporated by reference.

FIELD OF THE INVENTION

The present invention relates to selected lactide polymer compositions and processes for manufacturing such compositions.

BACKGROUND OF THE INVENTION

The present disclosure concerns ongoing efforts in developing lactide polymers useable in preferred manners. U.S. Pat. No. 5,142,023 issued to Gruber et al. on Aug. 25, 1992, the disclosure of which is hereby incorporated by reference, discloses, generally, a continuous process for the manufacture of lactide polymers from lactic acid. Selected polymers according to U.S. Pat. No. 5,142,023 have physical properties suitable for replacing petrochemical-based polymers for packaging, paper-coating and other applications. Related processes for generating purified lactide and creating polymers therefrom are disclosed in U.S. Pat. Nos. 5,247,058, 5,247,059 and 5,274,073 issued to Gruber et al., the disclosures of which are hereby incorporated by reference.

Generally, commercial exploitation of polymers utilizing processes such as those disclosed in the patents to Gruber et al. can involve conversion of raw material monomers into polymer beads, resins, or other pelletized or powdered products. The polymer in this form would then be sold to end users who would extrude, blow-mold, cast films, blow films, foam, thermoform, injection-mold, fiber-spin or otherwise convert the polymer at elevated temperatures, to form useful articles. The above processes (and related processes) are collectively referred to herein as "melt-processing". Polymers produced by processes such as those disclosed in the patents to Gruber et al., and which are to be sold commercially as beads, resins, powders or other non-finished solid forms, are herein generally referred to collectively as polymer resins. These polymer resins, if biodegradable, can help alleviate the environmental stress due to disposal of items such as packaging materials, coated paper products, films, single use diapers and the like.

It is generally known that lactide polymers or polylactides are unstable. The concept of instability has both negative and positive aspects. A positive aspect is the relatively rapid biodegradation or other degradation that occurs when lactide polymers or articles manufactured from lactide polymers are discarded or composted after completing their useful life. A negative aspect of such instability is the potential for degradation of lactide polymers during processing at elevated temperatures, for example during melt-processing by end-user purchasers of polymer resins. Thus, some of the same properties that make lactide polymers desirable as replacements for relatively non-degradable petrochemical polymers also can create undesirable effects during production of lactide polymer resins and processing of those resins.

Lactide polymers are subject to unwanted degradation during melt processing via a number of pathways. These pathways include hydrolysis and other side reactions, which, for example, result in lactide formation and decreased molecular weight of the polymer. Furthermore, as processing temperatures are increased (especially to above about 230° C.), lactide polymer degradation is substantially and undesirably accelerated. Accordingly, even if a relatively melt-stable lactide polymer can be produced, it would be generally desirable to provide a lactide polymer or resin formulation that can be processed into useful articles at reduced temperatures (i.e., especially and preferably at no more than about 180° C.).

During certain melt processing operations, linear polymers such as linear polylactide exhibit certain undesired flow properties, such as necking. For example, if polylactide is extruded as a film onto a moving substrate, the film of polylactide being directed onto the substrate will tend to neck under the tensional forces caused by the moving substrate. By "necking" in this context it is meant that the width of the film will tend to narrow as the film is pulled or stretched. This leads to problems with control of the process and problems with maintaining consistency in film thickness, etc. Specifically, in comparison to polypropylene or polyethylene, linear polylactides (PLA) typically exhibit substantially more problem necking and less melt strength. Linear polymers, such as PLA, also tend to exhibit hydrodynamic instability or draw resonance at high draw ratios. This draw resonance can cause a periodic variation in a coating width and/or gauge, for example, and can lead to rupture of the polymer web.

Moreover, in a coating application or blown film production the polymer must withstand various forces such as acceleration in going from the die to the substrate in a coating application or the gas pressure that causes stretching in a blown film. The ability to withstand these forces is referred to as "melt-strength". There has been a need for lactide polymer formulations that will have improved melt-strength.

SUMMARY OF THE INVENTION

Polylactide polymer compositions with improved melt-strength and rheology and methods for making the same are disclosed. The methods include providing in the polylactide polymer composition, polylactide polymer molecules which have been modified, relative to linear non-substituted polylactide, to provide increased molecular interaction among polylactide backbone chains in the composition. The polymer composition can (and preferably will) have at least one of the following, relative to linear non-substituted polylactide: an increased weight average molecular weight, increased branching and/or increased bridging. Preferably, the polymer has a number average molecular weight from about 10,000 (and more preferably at least 50,000) to about 300,000.

In addition, the preferred polymer compositions preferably have a residual monomer concentration of zero to about 2 percent by weight; and a water concentration of zero to about 2000 parts per million. The polymer should preferably have a weight average molecular weight from about 100,000 to about 1,200,000.

In many useful and preferred applications, the method will involve providing modified polylactide polymer molecules having sufficient molecular interaction to produce a polymer composition having a polydispersity of at least about 2.5. One manner in which this molecular interaction can be provided is generating bridging between polylactide molecules through free radical reaction. Such bridging can, for example, be generated by using a molar ratio of free radical initiator to polymer within a range of 0.01:1 to 10:1.

Preferably, sufficient molecular interaction is provided such that a polymer composition having a measured natural log of the intrinsic viscosity (in deciliters per gram) of at least 0.1 below a measured natural log of the intrinsic viscosity (in deciliters per gram) of a linear unsubstituted or non-substituted polylactide of comparable apparent weight average molecular weight (as measured by gel permeation chromatography) is produced. In addition, preferably sufficient molecular interaction is provided such that a polymer composition having reduced neck-in when processed, relative to a linear non-substituted polylactide of comparable weight average molecular weight, is produced. The neck-in should (and may) preferably be reduced such that a neck-in ratio for said polymer composition is less than about 0.8.

The method of producing the polymer may preferably involve forming polylactide molecules in a procedure including a reactant in addition to unsubstituted lactic acid or lactide. Preferably, the reactant provided includes: a non-initiating lactide reactant, an initiating reactant, a combination reactant and/or mixtures thereof. The reactant other than lactic acid or lactide can be an initiating reactant having one initiating group therein. The initiating group can be either an hydroxyl group or an amine group. Such a reactant would preferably contain a bulky organic group therein.

The reactant other than unsubstituted lactic acid or lactide can have more than one initiating group therein. These initiating groups can be hydroxy groups, amine groups, and/or mixtures thereof.

The reactant other than unsubstituted lactic acid or lactide can be a non-initiating lactide reactant containing one or more non-initiating groups selected from: epoxides; cyclic esters; and, combinations thereof. Also, combination reactants (including both initiating and non-initiating groups) may be used. In some applications, the reactant in addition to unsubstituted lactic acid or lactide can be a non-initiating lactide reactant that contains at least one carbon—carbon double bond. In still other applications, the reactant other than lactic acid or lactide can contain a bulky organic polymer entangling group therein.

Certain applications of the invention are directed toward compositions comprising: a polylactide based polymer composition having a number average molecular weight of at least 10,000 (and preferably at least 50,000); and preferably a polydispersity of at least 2.5. Preferably, the polymer has a weight average molecular weight of at least about 100,000 and not greater than about 1,200,000. Preferably, the polylactide-based polymer composition is provided to have a neck-in ratio of less than about 0.8. In addition, the polymer composition can have sufficient molecular interaction such that its intrinsic viscosity is at least 0.1 deciliter per gram below an intrinsic viscosity of a linear, non-substituted polylactide of comparable apparent weight average molecular weight, as measured by gel permeation chromatography.

The invention also includes a composition comprising the result of: (a) providing lactide or polylactide polymer; (b) providing a reactant other than unsubstituted lactic acid or lactide; and (c) reacting the lactide or polylactide polymer with the reactant to obtain an improved polylactide polymer composition. This polylactide polymer composition should be produced to have increased molecular interaction among polylactide backbone chains relative to a linear, non-substituted polylactide of comparable weight average molecular weight; a number average molecular weight of at least 10,000 (and preferably at least 50,000); and also preferably a polydispersity of at least 2.5.

It is an advantage to the present invention that improved polylactide polymer compositions can be made from a lactide mixture which has not been recrystallized from a solvent. That is, the lactide mixture may include initiators such as small amounts of water or lactic acid therein, yet improved polymer compositions according to the present invention (for example, those having a number average of molecular weight of at least 50,000) will still result. Preferred methods disclosed herein for accomplishing this involves reacting the lactide mixture which has not been recrystallized from a solvent (or a polymer resulting from a lactide mixture which has not been recrystallized from a solvent) with a non-initiating lactide reacting containing at least two non-initiating groups each selected from: epoxide groups; cyclic ester groups; and, combinations thereof. An alternate method useable to accomplish the desired result, disclosed herein, is using radical reactions to generate linking, or the introduction of a cross-linkable group into the polymer molecules. Also, chain extenders can be used. Variations of these approaches, and others, will be apparent from the detailed description below.

It is still a further advantage to the present invention that it may be applied in a continuous process production of polylactide-based polymers. That is, the various reactants can be inserted into a continuous process, with a sufficient control, to yield the desired polymer product. The reactants can be introduced as the lactide is continuously fed into a polymer reactor, for example, or downstream therefrom. Variations of this approach will be apparent from the following detailed descriptions.

DETAILED DESCRIPTION OF THE INVENTION

Figure 1:
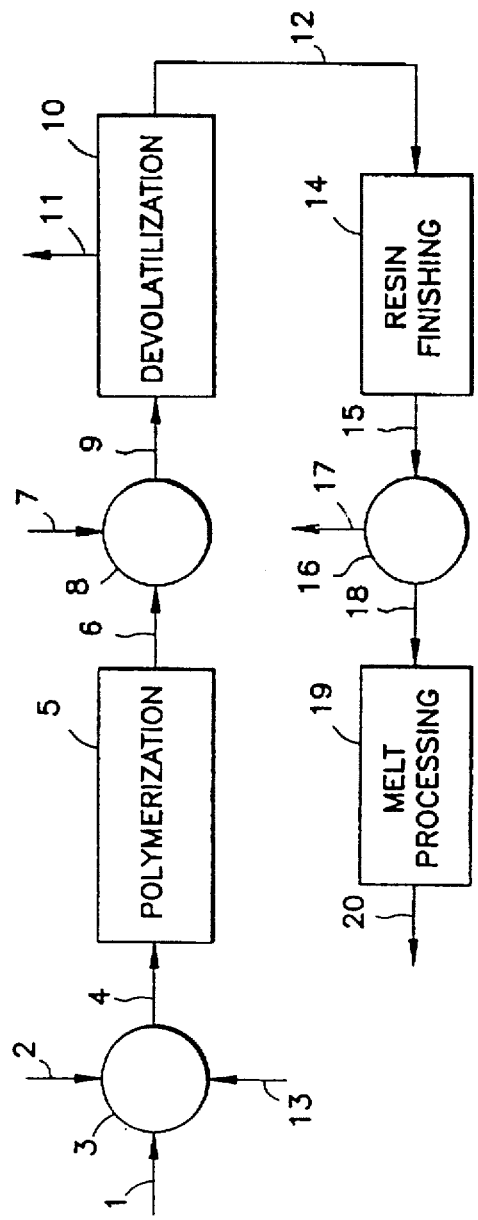
FIG. 1 is a schematic representation of a preferred process for the manufacture of a melt-stable lactide polymer.

The present invention concerns methods of improving polylactide polymers with respect to rheology (melt flow) and melt strength characteristics. In particular the invention concerns improvements in the rheology and/or melt strength of the molten polymer which tend to lessen propensities to "neck" or exhibit similar phenomena. The invention preferably concerns accomplishment of such improvements without undesirably affecting other preferred characteristics of preferred polylactide polymers including, for example: compostability and/or biodegradability characteristics; melt stable characteristics; and the characteristic of being able to be raised sufficiently above $t_g$ (glass transition temperature or softening point) for accomplishment of a fluid material of appropriate flow characteristics for processing, without reaching temperatures at which substantial or undesirable levels of degradation begins to occur.

The improved processing features achievable in some applications of the present invention include lower temperature processing, lower power consumption and pressure, and increased melt strength and improved melt flow characteristics. The polymers of the present invention may be melt processed into films, sheets, coatings for paper, blow molded articles, fibers, foam, foamed articles, thermoformed articles, injection molded articles, non-woven fabrics and the like. These articles may thereafter be components of various commercial articles, such as films for diapers.

Rheology

In general, the rheology characteristics of a resin or polymer are its viscosity or flow characteristics. For polymers such as polylactide (PLA), i.e. thermoplastic polymers, rheology or flow characteristics are used in reference to the characteristics exhibited by the polymer once the temperature of the polymer is raised above $t_g$ (or melting point if a crystalline polymer is involved). Generally, the concern is with respect to the flow characteristics of the polymer once it has been raised to a sufficient temperature that viscosity is reduced to a point where various melt processing steps are feasible.

Typically, for polylactide polymers (PLA) melt processing is feasible when the shear viscosity of the resin has been reduced to at least about 10,000 Pa-s (Pascal-seconds), and typically to within a range of about 1 Pa-s to about 1,000 Pa-s. For typical polylactide polymers such as those described in U.S. Pat. No. 5,142,023 to Gruber et al., $t_g$ is about 50° C. to about 65° C., and the materials are typically heated to about 160° C. to about 200° C. for processing.

With respect to rheology of linear polymers, various characterizations are typically made with respect to viscosity. Typically the term "viscosity" is used to characterize the melt flow characteristics of (or the flowability of) the polymer. With respect to these melt flow characteristics, two types of viscosity are generally considered important. One of these is shear viscosity, which generally relates to evaluations of capillary flow, i.e. how much of the molten polymer can flow through a capillary tube within a given period of time, etc. For example, in the paper coating industry, shear viscosity is used to indicate the force which will be needed to push the polymer through an extruder die. A higher shear viscosity indicates that a larger force is required to push the polymer resin through processing equipment, such as an extruder die, and a lower shear viscosity indicates that a lower force is required to push the polymer through processing equipment.

The other type of viscosity characteristic which is important is related to extensional viscosity. Extensional viscosity refers to viscosity in the absence of shear, and generally relates to the resistance of the polymer to flow when pulled or drawn. A higher extensional viscosity indicates that the resin is very resistant to flow when pulled or drawn, and a lower extensional viscosity indicates that the resin is not very resistant to flow when pulled or drawn.

Extensional viscosity is particularly important with respect to melt processing and the characteristic of necking. Change in extensional viscosity at increasing strain rate, and the time-dependent response of the polymer in extensional flow, can also be important with respect to melt processing operations. Collectively these define the extensional viscosity characteristics. A difficulty with conventional polylactides is that they are prone to neck, because of poor extensional viscosity characteristics.

Development of desireable polymers for melt processing requires, in part, development of a desireable balance of extensional viscosity characteristics and shear viscosity. If the extensional viscosity is not only increased, but the shear viscosity is also increased substantially, the characteristics of the polymer melt may be affected such that it is no longer desirable for melt processing. For example, if both the extensional and shear viscosities are substantially increased by increasing molecular weight, a lactide polymer resin may not flow sufficiently readily through conventional processing equipment (at conventional processing temperatures) to be widely acceptable. If the temperature in the processing equipment is increased to compensate for this lack of flowability, undesirable degradation of the polymer may be accelerated during polymer production or melt processing. Also, for example, if both extensional and shear viscosities are substantially decreased by decreasing molecular weight, a lactide polymer resin may require less force to flow readily through the conventional processing equipment, but the resin will be more prone to neck.

Further, a substantial advantage to the use of polylactide polymer in the formation of products is that, in general, polylactide is biodegradable or compostable. If the polymer is modified in such a way that the extensional viscosity characteristics are substantially increased, but significant losses in compostability or the ability to biodegrade the polymer occur, the tradeoffs may be unacceptable for wide utilization or acceptance of the material.

In general, for linear non-substituted PLAs it can be shown that as the molecular weight of the polymer increases, a plot of intrinsic viscosity versus apparent molecular weight, as measured by gel permeation chromatography (GPC) follows a well-defined curve. In addition, a higher molecular weight (i.e., above a critical molecular weight) lactide polymer is preferred, because the physical properties such as modulus, tensile strength, percentage elongation at break, impact strength, flexural modulus, and flexural strength remain relatively constant when the lactide polymer is above a threshold molecular weight. The lower limit of molecular weight of the preferred polymer compositions of the present invention is preferably set at a point above this threshold in order to result in a lactide polymer with more predictable physical properties upon melt-processing. In general, this critical "lower" number average molecular weight is at least about 10,000 (and preferably at least 50,000), and a preferable "lower" weight average molecular weight is at least about 100,000.

The practical upper limit of the molecular weight is based upon a practical upper limit of workable viscosity (viscosity generally increases with increased molecular weight). In order to melt-process a very high molecular weight lactide polymer, the melt-processing temperature must be increased to reduce the viscosity of the polymer. As the processing temperature is increased, however, undesirable degradation of the lactide polymer is accelerated.

The exact upper limit on molecular weight may vary depending on the particular melt-processing application since required viscosities vary, and residence time within the melt-processing equipment also varies. Thus, the degree of degradation, for a given polymer, in each type of processing system will also be expected to vary. It is believed that one could readily determine the suitable molecular weight upper limit for meeting the viscosity and degradation requirements in any selected application, however. Generally, the number average molecular weight of the preferred polymer will not be greater than about 300,000 and the weight average molecular weight will not be greater than about 1,200,000.

The Linear Nature of PLA

In general, poor extensional viscosity characteristics and rheology characteristics which lead to significant amounts of necking, are characteristics of linear polymers, and PLA is a linear polymer. Approaches to improving PLA, according to the present invention, generally concern methods of increasing interaction between the long polymer chains of individual molecules sufficiently to improve rheology, while at the same time not introducing so much interaction that other characteristics such as compostability, biodegradability, and melt-processability, are undesirably affected. Thus, an improved or modified polylactide polymer, in accord with the present invention, is one in which the interaction between the long polymer chains of individual molecules is increased such that rheology is improved, without substantially undesirably affecting compostability, biodegradability, and melt-processability of the polymer. In general, the methods described herein concern modifications that can be made during polymer resin formation. Thus, initially, a brief consideration of the formation of linear PLA is presented.

In general, linear (unsubstituted) PLA is formed from ring opening polymerization of the cyclic dimeric ester of lactic acid, i.e. lactide. This is described, for example, in U.S. Pat. No. 5,247,059 to Gruber et al. While the precise nature of the polymerization is not fully understood, in general it appears to concern chain propagation in the following manner. An initiator having a group containing an active moiety (such as a —OH group) therein is provided and mixed with the lactide. The initiator may comprise, for example, water, an alcohol, lactic acid, amines or other materials. The "active moiety group" reacts with one of the carbonyl groups of the cyclic dimer, to open the ring. Each ring opening results in the generation of an active —OH group on the end of the polymer backbone. The newly generated active —OH group can react with another lactide molecule, to ring open. Chain propagation thus occurs in a linear fashion. The length of the chains, i.e. the molecular weight of the resulting polymer, will in part depend upon the number of active —OH groups initially provided; and the rate of reaction and length of time allowed. If each initiator has only one or two, active —OH group(s) thereon, in general, the resultant polymer will be a linear polymer with one or two hydroxyl terminated ends. In general, as more equivalents of initiator are provided, the molecular weight of the resulting polymer will be lower. That is, in general, molecular weight is inversely proportional to the number of initiators.

Approaches to Generating Interaction Between Long Polymer Chains

As indicated above, generally, improving extensional viscosity characteristics in a linear polymer can be accomplished by providing interaction between the long polymer backbones. Providing interaction between the long polymer backbones, typically, can be accomplished by increasing the weight average molecular weight of the lactide polymer melt, providing branching within the lactide polymer, and/or providing bridging in the lactide polymer. In this context, "bridging" refers to bonding between long polymer PLA-based chains. The term "branching" refers to either providing pendent groups from a linear PLA-based polymer chains or providing long polymer segments joined to one another through a residue. The term "PLA-based polymer chains" refers to polymer chains in which the majority of repeat polymer units or residues are unsubstituted lactic acid or lactide residues. Preferably they comprise at least 50% by weight residues from lactic acid or lactide. Providing branching and/or bridging in the lactide polymer can lead to a less linear polymer.

Increasing Weight Average Molecular Weight

Increasing the weight average molecular weight of the polymer is a means of increasing interaction between backbone chains of the polymer because the higher the molecular weight, the more likely the polymer chains will interact with one another via molecular entanglement. The weight average molecular weight is the summation of the product of the molecular weight of the species, squared, and the number of molecules of the species, divided by the summation of the product of the molecular weight of the species and the number of molecules of the species.

The number average molecular weight of a polymer is the weight of a given sample of polymer divided by the number of molecules within that sample. For example, if a polymer mixture includes one polymer molecule of molecular weight 100,000 and two polymer molecules of molecular weight of 10,000 each, the number average molecular weight for the composition is 40,000, whereas the weight average molecular weight is 85,000.

Polydispersity is one indicator of increased weight average molecular weight and thus one indicator of increased interaction between the long polylactide polymer backbones. In general, the polydispersity (or polydispersity index or polydispersion index) of a polymer is defined by the relationship between the weight average molecular weight of the polymer and the number average molecular weight of the polymer. Specifically, polydispersity index is the ratio between weight average molecular weight and number average molecular weight. Therefore, an increase in polydispersity index can indicate an increase in the weight average molecular weight of the polymer, if the number average molecular weight of the polymer is held substantially constant.

The polydispersity index of linear polylactides prepared according to the methods of Gruber et al. as disclosed in U.S. Pat. Nos. 5,247,059 and 5,274,073 are generally within the range of about 1.5 to 2.5 and are typically about 2. Generally, the polydispersity indices of preferred polymers in accord with the present invention are at least about 2.5 and more preferably at least about 3. The higher the polydispersity index, in general, at substantially constant number average molecular weight, the better the extensional viscosity characteristics.

Any of a variety of means of increasing the PLA's weight average molecular weight such that the degree of polylactide molecular entanglements increases, and therefore improvements of the extensional viscosity characteristics of the polylactide polymer, may be used in accord with the present invention.

Introduction of Branching Into the Polymer Backbone

A method to improve the rheological properties of PLA is through introduction of branching into the polymer backbone. In particular, the introduction of branching into the polymer backbone produces less linear polylactide molecules. It is believed that less linear polylactide molecules exhibit improved rheological properties because the molecular entanglements last longer due to decreased ability to move by reptation (diffusion). Reduced neck-in is one property improved with the less linear polymer's improved rheological behavior.

Figure 2:
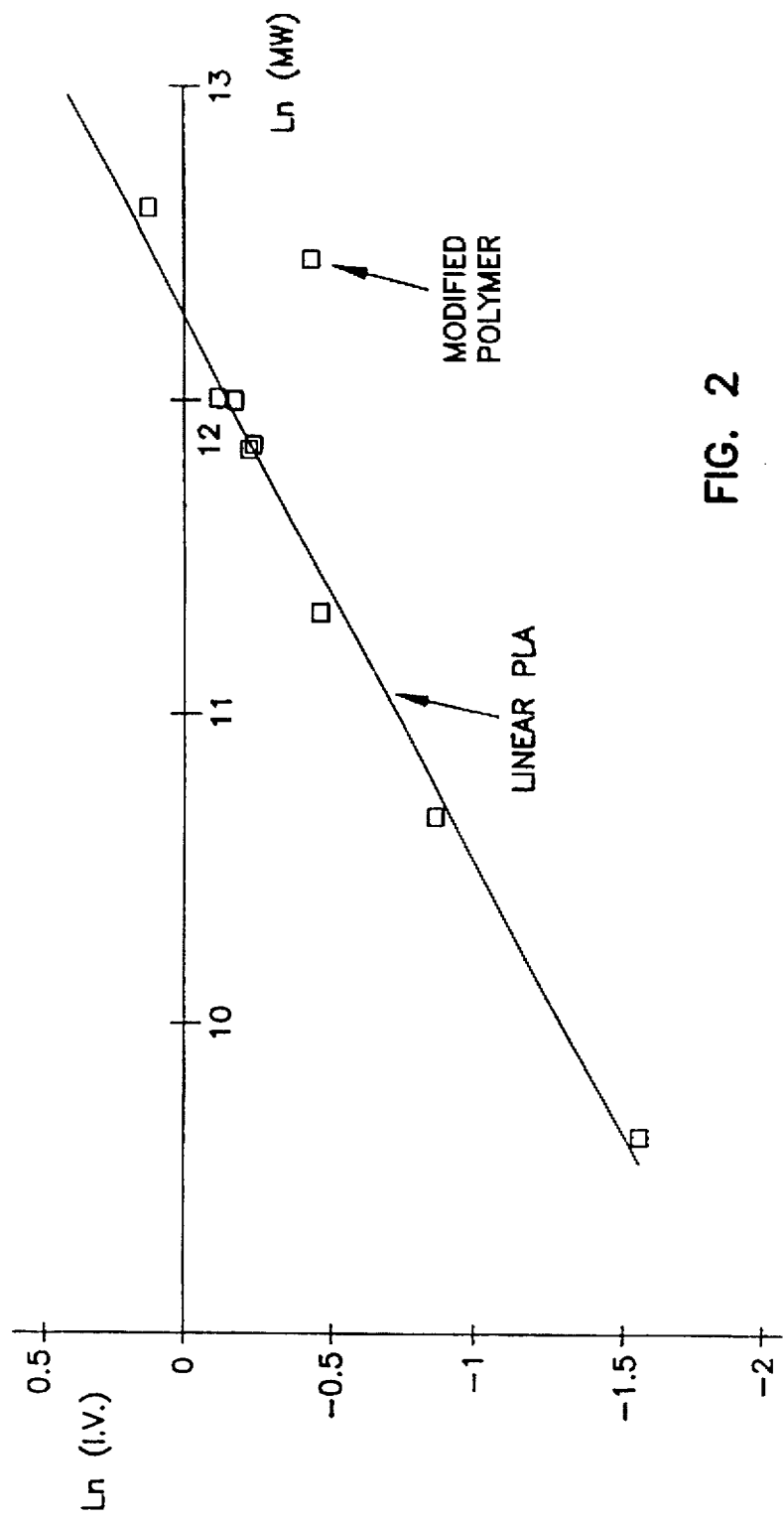
FIG. 2 is a graph of the natural log of a linear lactide polymer's intrinsic viscosity with respect to the natural log of the polymer's molecular weight.

Generally, as illustrated in FIG. 2, linear polylactide polymers exhibit a characteristic curve of intrinsic viscosity with respect to polymer molecular weight. As branching or other molecular interaction is introduced into the PLA, the resulting curve of intrinsic viscosity versus molecular weight deviates significantly from the graph of intrinsic viscosity versus molecular weight of a linear lactide polymer. This deviation is an indication that branching or other molecular interaction has occurred.

A variety of techniques is available for introducing sufficient branching into a linear polylactide to generate improved rheology. For example, an initiator may be used to introduce branching into PLA. In yet another approach, non-initiating lactide reactants, such as an epoxidized hydrocarbon or an epoxidized oil, could be introduced into PLA to form a branched (i.e. less linear) polylactide polymer. As another example, molecules containing at least two cyclic ester rings could be copolymerized with lactide to form a branched (i.e. less linear) polylactide polymer. In this context the term "cyclic ester" includes any cyclic compound containing at least one ester group and capable of ring opening polymerization. For example, cyclic esters may include lactones, cyclic carbonates and cyclic oxalates.

Other techniques for introducing branching involve providing a reactant which will leave a residue unit in the PLA-based polymer that includes a bulky organic group pendent therefrom. For example, a cyclic ester, such as a long-alkyl chain (at least $C_4$) substituted lactone, could be reacted to form residue units in the polymer with the $C_4$ group pendent therefrom.

The term "linear polylactide" as used herein refers to a linear non-substituted polylactide polymer, such as those disclosed in U.S. Pat. Nos. 5,142,023, 5,247,058 and 5,247,059 to Gruber et al. The term "polylactide polymer" as used herein refers to a polymer in which the majority of repeat units in the polymer chains are lactic acid based or lactide based residues. For example, after removing additives such as fillers and plasticizers using methods known in the art, such as extraction and filtration, a polymer sample is hydrolyzed or saponified. Typically, a polylactide polymer, after removing additives, will yield 50% or more, by weight, of lactic acid residues.

Providing Bridging Between the Polymer Backbones

Another way in which interaction between the polymer chains can be increased is to introduce bridging between polymer backbones. This bridging can be introduced subsequent to polymer formation. Bridging will generally improve the extensional viscosity characteristics of the PLA by providing a small amount of cross-linking between the long backbones and thus creating resistance to stretch or pull during polymer melt processing. Long backbone chains which have been bridged together, generally, form a new less linear polylactide molecule.

In general, as discussed previously, linear polylactide polymers exhibit a characteristic curve of intrinsic viscosity with respect to the polymer's molecular weight. As bridging is introduced into the linear polylactide polymer, the resulting curve of intrinsic viscosity versus molecular weight deviates significantly from the graph of intrinsic viscosity versus molecular weight of a linear polylactide polymer. This deviation is an indication that bridging has occurred and that less linear polylactide molecules are present in the polymer.

Any of a variety of means can be used to determine the presence of branching of, or bridging between, polymer chains. The following is an example of one technique. Control samples of dried and devolatilized linear polylactide are prepared. The molecular weights of the test samples should be within the range of the molecular weights of the controls. The samples are then dissolved in a solvent. This solvent should be the same solvent that is used as a mobile phase for the gel permeation chromatography (GPC). The intrinsic viscosity of each sample is determined at the same temperature and in the same solvent as the GPC is run. Using GPC, the molecular weights of the samples should be determined relative to a standard, such as polystyrene. Either weight average molecular weight or viscosity average molecular weight is used.

Based upon the GPC results, a plot of the natural log of intrinsic viscosity (in deciliters per gram) versus the natural log of molecular weight should be made. In addition, a regression line should be made for the control samples. This regression line is made by measuring the molecular weight and intrinsic viscosity of several (i.e. at least 3 and preferably at least 7) linear polylactide samples and plotting the results. These control samples should provide a range of molecular weights sufficient to accommodate the test samples as plotted on the same chart as the regression line. The test sample is considered to have preferred bridging or branching, in accord with the present invention, if the measured natural log of intrinsic viscosity is at least about 0.1 below the predicted value based on the regression line for the control samples. More preferably, the sample is prepared such that the measured natural log of intrinsic viscosity is at least about 0.2 below the control line and even more preferably at least 0.4 below the control line. See FIG. 2 for an example of a regression control line and a sample point. With this bridging or branching, (i.e. molecular interaction) the polylactide's viscosity is typically modified such that phenomena, such as necking, will be significantly reduced. If the test samples contain adulterants, such as plasticizers or fillers, they should be removed prior to determination of the extent to which there is bridging or branching in the polymer. Methods known in the art, such as dissolving, filtering and precipitating, can be used to remove these adulterants.

Various techniques are available for providing bridging in the linear lactide polymer and thus converting it into a less linear lactide polymer. For example, free radical generating peroxides can be used to cleave substituents from the polylactide backbones, generating a polymer radical that can bond with another polymer radical. Bridging may also be provided through the reaction of multifunctional chain extenders, to link polymer chains together and form a less linear polylactide.

Some Specific Means of Increasing Molecular Interaction

Overall, any means of increasing molecular interaction between polylactide backbones such that the rheological properties of the resulting polymer are improved and the resulting polymer is useable in melt processing operations, is in accord with the present invention. Generally, these means, as previously discussed, include increasing weight average molecular weight, providing branching in the polymer and/or providing bridging in the polymer. The following discusses some more specific means of increasing molecular interaction between polylactide polymer backbones. In general, control of the amount of interaction between the long polymer chains is desirable for maintaining a melt-stable, workable, compostable and/or biodegradable material. In evaluating possible specific methods for improving rheological properties, while at the same time retaining other preferred characteristics of melt stable polylactides, a number of approaches to increasing interaction between long polymer chains of polylactide have been evaluated.

The principal approaches can be divided into two types. The first type of approach involves reacting a radical generating moiety with a group contained in a polylactide polymer chain such that the residual polylactide chain becomes a radical that can react with another residual polylactide chain. Thus, two residual polylactide chains can bond or link to one another. A variation of this approach involves using a radical generating moiety to link to a reactant having either a bulky organic group therein (for branching) or a functional group therein that can be later reacted to cause bridging, to the polymer. An example of this latter would be maleic anhydride.

The second principal approach involves including a moiety other than unsubstituted lactide in some of the polylactide chains. There are at least three types of moieties other than unsubstituted lactide that can be included in the polylactide backbone in accord with the present invention. These three types of moieties originate from: a molecule containing one or more initiating groups; a molecule containing one or more non-initiating reacting groups; and/or a molecule containing both initiating and non-initiating reacting groups. The term "initiating group" refers to a moiety which can initiate polylactide chain formation by reacting with cyclic lactide in a ring opening reaction. The term "non-initiating reacting group" refers to a moiety with which lactic acid, lactide and/or the growing polylactide polymer can react during polymerization, but which does not itself initiate polylactide chain formation during the polymerization process (prior to its reaction with the lactide acid, lactide or growing polylactide polymer). The non-initiating reacting group should also allow the polymer chain to continue propagating after it has reacted.

There are at least two types of molecules that contain initiating groups. The first type contains one group therein from which polylactide chain formation can be initiated during polymerization. The second type contains more than one group therein from which polylactide chain formation can be initiated during polymerization. The compounds containing one and/or more than one of these types of groups are referred to herein collectively as initiating reactants.

Similarly, there are at least two types of molecules that contain non-initiating reacting groups. The first type contains one group therein to which lactide can bond during polymerization, but which does not initiate polylactide chain formation through ring opening of cyclic lactide (prior to reaction during polymerization). The second type contains more than one group therein to which lactide can bond during polymerization, but which does not initiate polylactide chain formation through ring opening of cyclic lactide (prior to reaction during polymerization). Compounds containing one or more than one of these types of groups are referred to herein collectively as non-initiating lactide reactants.

Compounds containing molecules having both initiating and non-initiating reacting groups therein can be used in accord with the present invention and are referred to herein collectively as combination reactants. In addition, initiating reactants, non-initiating lactide reactants, and/or combination reactants can be combined such that two or all three types of reactants are included in the polymerization process.

The following are general architectures or configurations representing molecules containing initiating reactants, non-initiating lactide reactants, and combination reactants. The first (1) configuration represents a molecule containing only one initiating group (X) therein.

R—X  (1)

The X represents the initiating group, and it can be any moiety which can initiate polylactide chain formation by reacting with cyclic lactide in a ring opening reaction. R represents any carbon containing group that does not prevent lactide polymer chain formation. R can be a non-linear carbon chain containing more than three carbon atoms. Preferably, R includes a bulky organic polymer entangling group therein. R can also contain conventional functional groups, which do not initiate lactide chain formation and which do not prevent the polymerization process. The term "polymer entangling group" in this context is meant to refer to a group R or within R which is sufficiently bulky to facilitate entanglement of the resulting polymer molecule R—X—PLA with other polymer molecules, in the resulting polymer composition.

Configuration two (2) represents a lactide polymer formed from molecules such as depicted in configuration (1). In configuration (2), the character PLA refers to a PLA-based polymer fragment which may (or may not) include residues which are not from lactide or lactic acid.

R—X—PLA  (2)

The polymer molecule depicted in (2) can be representative of a molecule contained in a polymer composition of the present invention. Preferably, R contains a non-functional polymer entangling group or non-linear group that facilitates molecular interaction such that the polylactide polymer's elongational viscosity characteristics are improved relative to linear polylactide of comparable weight average molecular weight. In this context, the word "improved" means that performance in a melt-processing operation is improved with respect to any of necking, bubble stability, reduced draw resonance or related characteristics.

Configuration (3) generally represents a molecule containing more than one (e.g. three) initiating groups therein.

(3)

The symbols $X_1$, $X_2$ and $X_3$ each represent an initiating group. The chemical structure of each of these groups can be the same or different. The R represents any carbon containing group that does not interfere with the polymerization process as discussed previously. Of course, an initiating reactant does not necessarily have to include three functional groups. It only needs to have at least one. Configuration (3) is merely an example of an initiating reactant molecule containing three initiating groups.

In general, configuration four (4) represents a lactide polymer molecule formed from an initiating reactant such as the type represented in configuration (3). The term "PLA" in configuration (4) may be the same as identified for configuration (2).

(4)

The $X_1$, $X_2$, and $X_3$ in configuration (4) each represent the residual initiating groups, which initiated polylactide chain formation. Because the type of molecule depicted in (4) is non-linear, it can facilitate molecular interaction. The polylactide chains formed from the initiating groups give greater entanglement with polylactide chains contained in other molecules in the composition. Thus, polymerizing a lactide prepolymer mixture containing an initiating reactant, such as one represented in (3), can provide a less linear polymer with increased molecular interaction.

A molecule contained in a non-initiating lactide reactant is represented by configuration (5).

(5)

In this configuration Y represents a non-initiating reacting group. R represents a carbon containing group that does not prevent lactide polymer chain formation, as discussed previously. Preferably, for non-initiating reactants R contains a bulky organic polymer entangling group containing more than three carbon atoms that can entangle with other R groups and lactide polymer molecules during polymerization. If R is too large, then it can undesirably diminish the flowability characteristics of the polymer.

In general, configuration six (6) represents a lactide polymer molecule formed from a molecule such as represented by configuration (5). In configuration (6), each PLA may be as defined for configuration (2).

$$\begin{array}{c} \text{PLA}-\text{Y}-\text{PLA} \\ | \\ \text{R} \end{array} \quad (6)$$

The Y, in configuration (5) represents a residual non-initiating group, which reacted with lactide and is incorporated into the resulting polymer chain. Due to the branching created by the R group in (6), molecular interaction between backbone chains can be increased, in accord with the present invention. From the above configuration (6), it will be apparent that preferably the non-initiating group Y is a group which can react with lactic acid, lactide, or a growing PLA-chain and then which, upon reaction, forms an active residue which can initiate further chain propagation. As explained hereinbelow, one such group is an epoxy group.

Configuration seven (7) represents a molecule containing a non-initiating lactide reactant having more than one (e.g. 2) non-initiating groups.

$$\begin{array}{c} Y_1 \\ | \\ R \\ | \\ Y_2 \end{array} \quad (7)$$

The $Y_1$ represents one non-initiating reacting group, and $Y_2$ represents a second non-initiating reacting group. $Y_1$ and $Y_2$ can be the same or different. For example, $Y_1$ can be an epoxy group, and $Y_2$ can be a cyclic ester containing group. As a further example, $Y_1$ can be an epoxy group and $Y_2$ can be an epoxy group. R represents a carbon containing group that does not prevent lactide polymer chain formation, as discussed previously.

Configuration (8) represents a lactide polymer molecule formed from a molecule, such as configuration (7) containing two non-initiating reacting groups. Each group (PLA) may be as defined for configuration (2).

$$\begin{array}{c} \text{PLA}-Y_1-\text{PLA} \\ | \\ \text{R} \\ | \\ \text{PLA}-Y_2-\text{PLA} \end{array} \quad (8)$$

The $Y_1$ and $Y_2$ in configuration (8) represent the residual non-initiating reacting groups which reacted with lactide and are incorporated into a polymer chain. The R group serves as a bridge between the backbones as two PLA-based polymer chains. This bridging provides increased molecular interaction such that the extensional viscosity characteristics of the polymer can be improved.

Configuration nine (9) represents a molecule containing one initiating group and one non-initiating reacting group. This molecule is of the type that could be found in a combination reactant.

$$\text{Y}-\text{R}-\text{X} \quad (9)$$

The Y represents a non-initiating reacting group as above described, and the X represents an initiating group as above described. The R, as discussed previously, represents any carbon containing group that does not prevent the polymerization process. The R contained in a combination reactant, preferably, is one of the preferred types of groups discussed previously with respect to configurations (1)–(8).

Configuration (10) represents a lactide polymer molecule formed from a molecule such as the type disclosed in configuration (9). Each group (PLA) may be as defined for configuration (2).

$$\begin{array}{c} \text{PLA} \\ | \\ \text{Y}-\text{R}-\text{X}-\text{PLA} \\ | \\ \text{PLA} \end{array} \quad (10)$$

The Y and X groups in configuration (10) represent the residual non-initiating reacting group and the residual initiating group. Because the polylactide chains are oriented in to make the molecule in (10) less linear than linear polylactide, the opportunities for polylactide chains to entangle with other chains is increased. This increased opportunity for entanglement, generally, results in increased molecular interaction in the polymer.

It will be understood that the polymer molecules represented by configurations (2), (4), (6), (8) and (10) above could, and in typical applications will likely, contain more than one residue of the reactants (1), (3), (5), (7) and (9), respectively therein.

The following discussion is a detailed description of specific types of radical generators, initiating reactants, non-initiating lactide reactants, and combination reactants that can be used in accord with the present invention. The specific initiating reactants, non-initiating lactide reactants, combination reactants and resulting polymers described or utilizing these reactants are of the general types represented by configurations (1)–(10).

Generating Interaction Between Linear Polymer Molecules Using Free Radical Reaction This approach to generating small amounts of bonding between linear polylactide molecules was generally characterized above. The following scenario will provide a greater understanding of this technique. Consider a mixture of polylactide polymer materials. If a free radical initiator is provided in the mixture, the initiator will, upon activation, generate free radicals. Among the possibilities of follow-up reaction, is that various free radicals from the initiator will react with carbon-hydrogen bonds in different polymer molecules, for example removing a hydrogen atom from each and generating, in the remaining or residual polymer molecule, a free radical. This reaction is believed to most likely (statistically) take place at one of the tertiary carbons in the polymer backbone.

The polymer has now become a free radical or a free radical residue of a polylactide polymer. Among the reactions of which it is capable, is reaction with yet another polymer molecule, which has been converted to a polymer radical by the same process. Reaction with the other polymer radical would generate a bond between the two polymer molecules. It will be understood that in general such a polymer free radical reaction is statistically unfavored. However, it need only occur to a small extent for sufficient linear polymer linking (bridging) to occur, to increase molecular interaction, and thus enhance rheology characteristics.

This mechanism for providing interaction among polylactide polymer chains, although useful, does have some drawbacks. For example, there is potential for gel formation. More specifically, if too much initiator is used there may be so much interaction among the residual polymer chains that the polymer gels and loses much of its flowability characteristics. Processing a polymer with poor flowibility characteristics can be difficult and costly. Therefore, polymer gelling is discouraged.

The radical generator, preferably, is added during or after polylactide formation. Combining the radical generator with the polylactide after polymerization adds a step to the polymer processing. However, the reaction rate of this process is typically so fast that very little additional processing time is typically needed.

Another example of a drawback of this mechanism is that byproducts can be produced. Because there is no precise control over what the radicals generated during this process will react with, there are typically several types of byproducts that result from this reaction process. These byproducts may have to be separated from the resulting polylactide polymer prior to melt-processing the polymer.

An advantage of this mechanism for generating interaction among polylactide chains is that many radical generators are inexpensive and readily available. In addition, many break down to byproducts which are readily removed, for example, by devolatilization. Also, the extent of bonding is so small that the biodegradability or compostability of the polylactide polymer is not significantly lost.

A variety of free radical initiators may be utilized to generate interaction between linear polymer molecules according to this technique. In general, any radical initiator that readily removes a moiety, such as hydrogen, from a polylactide chain to form a residual polylactide free radical (which can then react with another residual polylactide free radical) can be used in accord with the present invention. A wide variety of peroxide radical initiators are known and can be used. Peroxide initiators useable in accord with the present invention include: 2,5-dimethyl-2,5-di(t-butylperoxy) 3-hexyne; 2,5-dimethyl-2,5-di(t-butylperoxy) hexane; 2,5-dimethyl-2,5-di(t-amylperoxy) hexane; 4-(t-butylperoxy)-4-methyl-2-pentanol; Bis(t-butylperoxyisopropyl) benzene; Dicumyl peroxide; Ethyl 3,3-bis(t-butylperoxy) butyrate; Ethyl 3,3-bis(t-amylperoxy) butyrate; and, Dibenzoyl peroxide. Commercial products such as Lupersol 130; Lupersol 101; t-amyl 101; Lupersol D-240; Luperox 802; Luperox 500; Lupersol 233; Lupersol 533; and, Lucidol 78, available from ELF Atochem of Philadelphia, Pa. are useable. A preferred radical initiator is ethyl 3,3-di-(t-butylperoxy)-butyrate), preferably as Luperco 233-XL (available from ELF Atochm, as a 40% concentration of the peroxide in a $CaCo_3$ carrier). A preferred addition technique is to compound the peroxide into the PLA using a twin screw extruder.

In general, to achieve a sufficient interaction among polymer chains to improve rheology (extensional viscosity characteristics) in a manner sufficient to inhibit necking or the like, a relatively large amount of initiator will be needed. Typically, if molar ratios of initiator to polymer of about 0.01:1 to 10:1 (more preferably 0.05/1 to 3/1) are used, a sufficient amount of polymer interaction will occur to achieve improvement in rheology. In such circumstances (as has been observed) the number average molecular weight of the polymer increases by only about ten percent, whereas the weight average molecular weight increases about twenty percent or more. Molar ratios of initiator to polymer of above about 10:1 are believed likely to cause excessive gelling in typical systems.

Generating Bridging using Chain Extenders

This approach to increasing molecular interaction is accomplished by providing a chain extending agent. The chain extending agent bonds to the terminus of the polymer chain. By providing a chain extending agent with three or more functional groups a linear polylactide can be made into a less linear polylactide through bridging. If the polylactide is already a less linear polylactide, then a bifunctional chain extender can be used to increase molecular weight. Gel and network formation can be a problem in this case, however.

Preferably, the chain extender will have a functionality of three or greater. Typically, the extender should be present in a ratio of about 0.1–1.0 equivalents of extender per mole of polymer.

Chain extenders can include any compounds capable of reacting with the —OH or —COOH terminus group. Examples include oxazolines, isocyanates, dihydrooxazines, and anhydrides. Preferred chain extenders would be non-toxic and biodegradable.

Providing an Initiating Reactant

One of the means of increasing molecular interaction between linear polylactide chains is to provide an initiating reactant, into the prepolymer or polymerizing mixture, from which lactide polymer chains can grow during polymerization. As discussed previously, the molecules contained in the initiating reactant can have one initiating group from which lactide polymer formation can begin or more than one initiating group from which lactide polymer formation can begin. However, if the molecules contain only one or two initiating groups, an additional means of providing interaction will likely have to be provided in order to increase molecular interaction. In other words, providing one or two initiating groups alone may not increase molecular interaction between polymer backbones, because usually bridging or branching cannot be introduced using these types of initiating reactants.

However, if a combination reactant, which includes molecules having at least one initiating group and at least one non-initiating reacting group, is used, for example, molecular interaction can be increased in the resulting polymer, although there is only one or two initiating groups. This was discussed with respect to configurations (9) and (10). In sum, reactants containing molecules having one or two initiating groups can be used to increase molecular interaction among polylactide backbone chains, depending upon what else is in the molecule.

More specifically, if an initiating reactant molecule having a single initiating group thereon is utilized, for example, a single polymer chain begins to form from the initiating group, such as an —OH group contained in the initiating reactant molecule, during lactide polymerization. However, this single chain alone generally does not increase molecular interaction between the backbone chains (unless the initiating reactant includes an appropriate pendent group therein). Therefore, unless the initiating reactant molecule contains a sufficiently bulky organic group therein, the initiating reactant molecule should include therein a non-initiating reacting group, for example, such as an epoxide, in order to increase molecular interaction by providing branching and/or bridging; thus, making this initiating reactant a combination reactant.

An initiating reactant containing molecules that have more than one initiating group thereon can be used to increase the molecular interaction between linear polylactide chains. However, if this type of initiating reactant molecule contains only two initiating groups thereon, such as two active —OH groups, the polymer can begin to grow in two directions from the initiating group (i.e., growth will begin from each initiator). Therefore, a linear polymer can result as discussed previously with respect to use of an initiating reactant molecule having only one initiating group, and molecular interaction between backbones is not increased (unless the initiating reactant includes one appropriate bulky pendent group therein or is a combination reactant). Thus, as discussed with respect to the initiating reactant having one initiating group, an additional means of increasing molecular interaction can be used, or the reactant molecule can be appropriately configured, so molecular interaction can be increased. For example, the reactant molecule may be a branched polymeric molecule.

If the initiating reactant molecule includes three or more initiating groups, such as —OH groups, thereon, for example, long polymer chains can begin to grow in at least three directions from the initiating reactant molecule. In essence, each initiating group could provide a single point of branching, at a terminus of each of three or more, long, polymer chains, such as previously discussed with respect to configurations (3) and (4). Thus, the result of utilization of an initiating reactant with three or more active groups can be introduction of a small amount of interaction between long polymer chains, and thus improvement in extensional viscosity characteristics and improvement in rheology characteristics with respect to necking. These initiating reactants can be added either before or during polymerization of lactide as described in U.S. Pat. Nos. 5,247,059 and 5,274, 073 issued to Gruber et al., for example. These reactants can include molecules (or even reactive groups in one molecule) of one type or a mixture of several types depending upon the particular polymer desired.

A variety of types of initiating reactants can be used in accord with the present invention. Any initiating reactant molecule with one or more initiating groups that can be used to initiate polylactide chain formation is useable in the present invention as long as the resulting polymer is of a sufficient molecular weight for the particular application in which it is to be used. Preferably, the resulting polymer is melt stable. Typically, these groups will be —OH (hydroxy) or NH$_2$ (amine) groups. In addition, it would also be preferable that these initiating reactants be biodegradable. Some examples of initiating reactants that can be used in accord with the present invention are sugars, alcohols such as dodecanol; diols such as 1,6-hexanediol; hydroxy esters such as methyl lactate; glycerol; 2-ethyl-2(hydroxymethyl) -1,3 propane diol; pentaerythritol; di-pentaerythritol; erythritol; xylitol; and, sorbitol. The latter 7 compounds are preferred since they have a reactive functionality of ≧3.

During polymerization, the lactide chains grow from the initiating groups. Thus, lactide polymer chains (i.e. PLA-based polymers), containing the residue(s) of an initiating group result. This resulting polymer will have a substantially improved extensional viscosity characteristics and melt flow properties and will be less linear. In addition, for lactide polymer chains formed from an initiating reactant, there typically is relatively little gel formation. Lactide polymers produced by some of the other methods in accord with the present invention significantly gel, which is undesirable and which can increase the viscosity such that the polymer can lose its flowability characteristics.

Lactide tends to react very quickly with the initiating groups. Therefore, the reaction time for polymerization using initiating reactants can be short. Typically, the amount of initiating reactant that is needed to generate the less linear polymer with improved extensional viscosity characteristics varies with the particular application of the polymer. In general, enough initiating reactant should be added to the prepolymer or polymerizing mixture in order for there to be enough molecular interaction, such as entanglement of the lactide polymer chains, to improve the extensional viscosity characteristics and improve melt flow properties. However, there cannot be so much initiating reactant added that the molecular weight of the polymer is reduced below a critical molecular weight. In general, more than about 5% of the polymer composition by number should be molecules containing residues of initiating reactant molecules. Preferably, the concentration of molecules containing residues of initiating reactant molecules is more than about 20% by number. Most preferably, the concentration of molecules containing residues of non-reactive initiating reactant molecules is more than about 33% by number. Preferably, a resulting polymer in accord with the present invention has a weight average molecular weight of at least about 100,000.

Unfortunately, this approach to developing interaction between the polymer chains of an inherently linear polymer such as polylactide is not always fully satisfactory in practical application. In general, for commercial exploitation, polylactides can be formed from the polymerization of lactide purified according to the methods described in U.S. Pat. Nos. 5,142,023 and 5,247,059 to Gruber et al; i.e. purification procedures which do not involve recrystallization of the lactide mixture from a solvent. Such lactide, while relatively pure, can include significant amounts of initiators, which are byproducts of the lactide production process, therein. For example, some of these initiators have an active —OH group. While the amounts of byproducts in the purified lactide can be effectively reduced to zero by extreme purification methods (such as recrystallization from a solvent), in general, it is not necessarily commercially practical to engage in excessive purification efforts. These byproducts include, for example, water and lactic acid, which can compete with the initiating reactants added to the prepolymer mixture, in almost any commercially feasible, large-scale, polymerization process. This restricts the concentration of molecules containing residues of the added initiating reactants.

A net result of utilizing initiating reactants, such as hydroxyl initiating reactants in the presence of substantial amounts of reactive initiators, which are reaction byproducts or intermediates, such as lactic acid and water, can be a reduction in the molecular weight of the resulting polymer. The result can be a less desireable polymer, with respect to its melt processing characteristics. In particular, the addition of initiating reactants to the prepolymer or polymerizing mixture can promote a reduction in the weight average molecular weight. A reduction in the weight average molecular weight can result in a decrease in the amount of molecular interaction, such as molecular entanglements; and therefore, the film forming properties of the polylactide can be compromised, despite the introduced branching.

In sum, while initiating reactants can be utilized to generate polylactide polymers, which are modified to have some interaction among the long polymer chains, in practice the approach is not always fully desirable. In order to control polymer molecular weight in a desired manner, it would be desirable to have very strict control of the co-presence of reactive initiators (such as water, lactic acid or oligomers) in the materials. In commercially useable purified lactides (not purified by recrystallization from a solvent), a sufficient amount of residual water and/or lactic acid or oligomers is usually present, to provide for a level of single chain initiation which is such that undesirable polymers, with respect to molecular weight, can result if initiating reactants are also added to the polymerization process. Thus, for use with present commercially viable processes for purifying lactide (especially those which do not involve recrystallization from a solvent), alternate approaches described herein to providing polylactide having some interaction among the long polymer chains, typically, will be preferred.

Providing Non-initiating Lactide Reactants

Another approach to increasing molecular interaction involves utilizing non-initiating lactide reactants to generate interaction between long polymer chains. This technique is advantageous because it does not involve the addition of initiating reactants into the prepolymer or polymerizing mixture. Thus, it is well adapted to application in processing using polylactide mixtures which have not been purified by recrystallization from a solvent.

In general, a non-initiating lactide reactant is a material which, when reacted with lactic acid, lactide or polylactide, reacts with an active —OH in the polylactide but which cannot, by itself and before reaction with the lactic acid, lactide or polylactide, initiate propagation. For example, for propagations involving lactide ring opening to form polylactides, epoxy compounds are non-initiating lactide reactants. In particular, when the active —OH group of a lactide or polylactide molecule reacts with the epoxy group contained in a non-initiating lactide reactant, the oxirane ring opens and provides a new —OH group for further reaction with lactides (i.e. chain propagation). However, for each oxirane group only one reactive —OH group (for propagation) is formed from a reaction with the lactic acid or lactide polymer. Thus, the oxirane ring does not initiate polymer formation but rather merely becomes incorporated into the polymer chain and will permit chain propagation to continue.

In general, if the non-initiating lactide reactant has essentially one non-initiating group, such as an oxirane ring or an epoxy group thereon, the net result is the formation of a polymer of linear molecules each having one or more residues of the non-initiating lactide reactant molecule incorporated therein. If the non-initiating lactide reactant also has a polymer entangling group thereon, such as a polyester, polyether or hydrocarbon, then these pendent chains can entangle with polylactide chains and/or other entangling groups to increase molecular entanglement and therefore increase molecular interaction and improve melt flow properties. It is believed that if the groups in the pendent chains are such that they comprise at least about 10% by weight of the polymer, the melt flow properties will be significantly and advantageously altered. These pendent chains could be provided either as a large number of short chains or as a few long chains. This mechanism with respect to a single epoxy group is also applicable to other non-initiating lactide reactant molecules containing only one non-initiating reacting group. The determination of at least 10% would typically be done based on reactants.

If the non-initiating lactide reactant molecule includes two non-initiating reactive groups, such as cyclic esters, or epoxy groups thereon, it can be used to link long polymer chains together (i.e., the residue of the non-initiating lactide reactant molecule becomes a bridge). The bridge can be longer if the active groups are at the ends of a hydrocarbon chain, for example. Similarly, if a non-initiating lactide reactant includes three or more non-initiating reactive groups then the result can be a polymer molecule having numerous long polylactide chains extending in different directions. In general, the use of non-initiating lactide reactants leads to a polymer with improved melt flow properties and preferred characteristics with respect to processing phenomena, such as necking.

A variety of materials are useable to generate improved polylactide polymers with respect to melt flow properties, through reaction with non-initiating lactide reactants. Useful non-initiating lactide reactants for this purpose include, for example, copolymerizing agents having one epoxy group per molecule and a bulky organic group such as a hydrocarbon chain containing at least four carbon atoms. Other useful non-initiating lactide reactants include, for example, copolymerizing agents having two or more epoxy groups per molecule, such as many epoxidized oils. When copolymerizing agents containing a hydrocarbon chain of at least four carbon atoms and having at least one epoxy group per molecule are added before or during polymerization, a less linear polymer can result when compared to non-copolymerized lactide polymers. Also, when copolymerizing agents having two or more epoxy groups per molecule are added to the prepolymer mixture before or during polymerization, a less linear polymer can result when compared to non-copolymerized lactide polymers.

Useful copolymerizing agents or non-initiating lactide reactants having epoxide groups include epoxidized fats and oils of many kinds. In particular, when lactide is copolymerized with an epoxidized oil, it is believed that the oxirane rings of the epoxidized oil react with either terminal alcohol groups or terminal acid groups of the lactide polymer during reaction to form a less linear lactide polymer compared to a non-copolymerized lactide polymer.

Preferably, epoxidized: fatty acids, glycerides, diglycerides, triglycerides and mixtures thereof, are used a copolymerizing agents. More preferably, epoxidized: animal fats, animal oils, vegetable fats, vegetable oils, monoglycerides, diglycerides, triglycerides, free fatty acids and derivatives thereof are used. Most preferably, epoxidized vegetable oils such as epoxidized linseed oil, epoxidized soybean oil and mixtures thereof are used. Additional useful epoxidized oils may include epoxidized: cottonseed oil, ground nut oil, soybean oil, sunflower oil, rape seed oil or cannola oil, sesame seed oil, olive oil, corn oil, safflower oil, peanut oil, sesame oil, hemp oil, tung oil, neat's food oil, whale oil, fish oil, castor oil, and tall oil.

Epoxidized linseed oil has been used as a copolymerizing agent with great success. In particular, an epoxidized linseed oil known as Flexol® Plasticizer LOE (commercially available from Union Carbide Corporation) is a preferred copolymerizing agent of the present invention.

It is interesting that epoxidized linseed oil is marketed as a plasticizer, however the $T_g$ of the resultant polymer is fairly constant, which indicates little plasticizing effect at the levels tested. An advantage associated with copolymerizing agents such as epoxidized linseed oil, is they can act as a lubricant during processing without the resultant polymer having a greasy texture.

Epoxidized soybean oil, for example, Paraplex® G-62, commercially available from C. P. Hall Corp., is also a preferred copolymerizing agent for the present invention.

It has been found that die processability characteristics can be improved with use of compositions and methods of the present invention. In particular, it has been found that, when processing polymers of the present invention while holding temperature, molecular weight, polymer flow rate and plasticizer concentration constant, there can be a reduction in die pressure when compared with linear non-functionalized polylactide polymers of comparable weight average molecular weight. This advantageous reduction in die pressure has been found to be most evident when using non-initiating lactide reactants, such as epoxides, to promote molecular interaction in accord with the present invention.

Coating operations, for example, can be conducted more efficiently with use of a polymer that contributes to improved die processability characteristics, such as reduced die pressure. This reduction can save energy and reduce equipment wear. Preferably, in accord with the present invention, a polymer is prepared such that it can be processed with a die pressure that has been reduced at least 10% when compared with linear non-functionalized PLA of comparable weight average molecular weight that is processed under similar conditions. More preferably, the polymer is prepared such that there has been at least a 15% die pressure reduction and most preferably, there has been at least a 20% die pressure reduction. In general, a preferred polymer in accord with the present invention is prepared such that it can be processed with a die pressure that has been reduced with respect to a linear polylactide of comparable weight average molecular weight this is melt processed under the same conditions. This die pressure reduction is illustrated below in Examples 9 and 13.

Regardless of what type copolymerizing agent (i.e. non-initiating lactide reactant) is used, the amount of copolymerizing agent added to the prepolymer mixture can vary with the specific application. Generally, if the amount of copolymerizing agent (i.e. non-initiating lactide reactant) added to the prepolymer or polymerizing mixture is insubstantial, then the melt flow properties of the resulting polymer will not be improved. Moreover, if too much copolymerizing agent (i.e. non-initiating lactide reactant) is added to the prepolymer or polymerizing mixture then the reaction can lead to very high molecular weight polymers and/or gels. In general, the amount of copolymerizing agent will vary with the desired molecular weight and polydispersity index of the resulting polymer. A practical lower limit on the copolymerizing agent is to have at least 1 equivalent (equivalents=moles of functionality) of copolymerizing agent for every 20 moles of polymer. More preferably, the copolymerizing agent is present at a level of at least 1 equivalent of copolymerizing agent for every 10 moles of polymer. Most preferably, the copolymerizing agent is present at a level of at least 1 equivalent of copolymerizing agent for every 5 moles of polymer.

A practical upper limit on the copolymerizing agent is determined based on the following conservative estimate of a theoretical gel point (TGP). The TGP, in equivalents of copolymerizing agent per mole of polymer, is estimated as:

$$TGP=f/f-1$$

where f is the functionality of the copolymerizing agent. The concentration of copolymerizing agent is preferably less than 5×TGP, more preferably less than 2×TGP, and most preferably less than 1×TGP. The moles of polymer can be estimated beforehand from the total moles of initiator, as determined, for example, by gel permeation chromatography.

For f=1 the TGP goes to infinity, as gelation cannot occur. For this case, the maximum amount of copolymerizing agent is preferably less than 50%; and more preferably less than 10% of the polymer weight.

Preferably, the copolymerizing agent is biodegradable, or forms a biodegradable residue in the polymer, so that combinations of the lactide and copolymerizing agent (i.e. non-initiating lactide reactant) can also be biodegradable.

In addition to epoxides, cyclic esters can be used as non-initiating lactide reactants. Cyclic esters, such as lactones, can be used as non-initiating lactide reactants. As discussed above with respect to epoxides, if a monofunctional cyclic ester is used, then the non-initiating reacting group should preferably be at the terminus of a non-functional polymer entangling group contained therein. If a multifunctional cyclic ester is used, for example, then the non-initiating reacting group(s) of the multifunctional cyclic ester serves as a bridge between two polylactide chains. Either of these mechanisms can provide significant branching or bridging and thus increased molecular interaction in the polymer.

A variety of cyclic esters that react with lactic acid, lactide or growing lactide polymer, (without initiating or terminating propagation) can be used as a non-initiating lactide reactant, as long as the resulting polymer's processability is not compromised. These non-initiating lactide reactants can be added before or during polylactide polymerization.

Preferably, the cyclic esters or lactones used as non-initiating lactide reactants are ones which are biodegradable in accord with the biodegradability of the resulting polylactide polymer.

Multi-cyclic esters may also be used as non-initiating lactide reactants. For example, bis-2,2-(E-caprolacton-4-yl) propane is useable. Other useable multi-cyclic esters are identified in U.S. Pat. No. 3,072,680, the disclosure of which is incorporated herein by reference.

A drawback of using cyclic esters is that they presently can be relatively expensive. However, an advantage is these reactants can react at about the same rate as lactide during polymerization so that a predictable, uniform, branched polymer can be produced.

Any of the compounds and/or methods described in this section can be combined in order to form a viscosity modified polylactide polymer. For example, more than one type of non-initiating lactide reactant can be added to the prepolymer mixture in order to form a polymer that contains residues of more than one type of non-initiating lactide reactant. Chemically different types of non-initiating lactide reactants can be combined and added to the prepolymer mixture (e.g. both a reactant containing a cyclic ester and a reactant containing an epoxide can be used). In addition, both non-initiating lactide reactants and initiating reactants can be added to the prepolymer mixture. Further, a combination reactant can be used instead of an initiating reactant and/or non-initiating lactide reactant in accord with the present invention. Moreover, a combination reactant can be combined with an initiating and/or non-initiating lactide reactant to promote molecular interaction in accord with the present invention.

Utilizing Initiating Reactants and/or Non-initiating Lactide Reactants Containing Groups Capable of Controlled Reaction Another means of promoting molecular interaction between linear polylactide chains is provided by using selected initiating reactants and/or non-initiating lactide reactants having therein groups which are not themselves initiating or non-initiating during the polymerization reaction, but rather are groups which can be later reacted to link linear polymer chains. For example, if a reactant molecule contains a moiety having one active hydroxy group therein (i.e., an initiating group) and located elsewhere in the initiating reactant molecule is a carbon—carbon double bond, the following scenario is possible.

The initiating group can be utilized to, through reaction of the active hydroxy group, generate formation of a single linear polymer chain having located near one terminus the carbon—carbon double bond moiety. As a result, when such an initiating reactant molecule is used, the resulting polymer mixture will include therein various polymer molecules having a carbon—carbon double bond near afterminus thereof. These double bonds can be reacted through a variety of processes, in a controlled manner, to "link" the linear polymer molecules to one another. For example, the carbon—carbon double bonds can be reacted by a subsequent free radical reactions with or without an additional monomer capable of free radical polymerization. As another example, a non-initiating lactide reactant may have an epoxy group at one-terminus of a hydrocarbon chain and a carbon—carbon double bond at another terminus of the chain. In this latter case, the carbon—carbon double bond would be located in a group pendent from a residue of the non-initiating lactide, somewhere in the resulting PLA-based polymer molecule.

Although the method of making a lactide polymer using a reactant containing an epoxide group, for example, and a carbon—carbon double bond as the non-initiating lactide reactant, requires an additional processing step, these types of non-initiating lactide reactants are readily available and provide for gel and reaction control. This non-initiating lactide reactant would be added either before or during polymerization of the lactide polymer. Once the epoxide is reacted, the carbon—carbon double bond would provide a means for additional polylactide moieties to react. Thus, the double bonds could be reacted, as described below, to provide bridging between the polymer.

Useable non-initiating reactants which include a carbon—carbon double bond are identified at cols. 7–8, in U.S. Pat. No. 4,644,038, incorporated herein by reference, and include: 1,2-epoxy-7-octene; glycidyl acrylate; glycidyl methacrylate; glycidyl undecylenate; allyl glycidyl ether; methyl vinyl glycidyl amine; vinyl 3,5-epoxy cyclohexane; allyl 3,4-epoxy cyclohexane; 3,4-epoxy-cyclohexyl acrylate; 2,3-epoxypropyl 4-vinyl phenyl ether; 2,3-epoxy cinnamyl acrylate; 2,3-epoxybutyl methacrylate; and, 9,10-epoxyoleyl acrylate.

In general, preferred initiating reactants and non-initiating lactide reactants for such an application of principles, in accord with the present invention, will include those initiating reactants and non-initiating lactide reactants that have a (preferably) terminal hydroxy, amine, and/or epoxy group therein and also a (preferably) terminal carbon—carbon double bond or other potentially reactive moiety. Reaction rate and gel formation are better controlled if these types of initiating reactants and/or non-initiating lactide reactants are used. In addition, many of these types of initiating reactants and non-initiating lactide reactants are readily available. These initiating reactants and non-initiating lactide reactants can be added before or during polymerization, but a reaction step is needed to react the potentially reactive moiety, such as the double bonds. If double bonds are provided they can be reacted by any means known in the art, such as with use of a free radical process. This post reaction step is relatively fast so reaction residence time will not be significantly increased.

The amount of initiating and/or non-initiating lactide reactants containing a double bond to be added varies with the particular application and type of reactant used. In general, enough initiating and/or non-initiating lactide reactant should be added such that the extensional viscosity of the polymer is sufficiently improved. However, not so much initiating reactant and/or non-initiating lactide reactant should be added such that the polymer loses its flowability characteristics and becomes difficult to process. In general, about 0.01 to about 0.30 equivalents of initiating reactant and/or non-initiating lactide reactant should be used per mole of polymer and preferably about 0.02 to about 0.15 mole/mole.

In order to protect the unsaturated bond during polymerization a free radical inhibitor should be used. Some types of free radical inhibitors useable in accord with the present invention include: the quinones (e.g. p-benzoquinone; hydroquinone; 2,5-dihydroxy-p-benzoquinone; 1,4-naphthoquinone; and 2,5-diphenyl-p-benzoquinone); aromatic-nitrogen compounds; trinitro benzene; sulfur; ammonium thiocyanate; dinitrochlorobenzene; 2,2-diphenyl-1-picrylhydrazyl; metal halides; 2,6-di-t-butyl cresol; quaternary ammonium halides; picric acid; chloranil; 4-amino-1-napthol; copper; and, copper compounds. Preferably the quinones without hydroxy groups are used. The residues of the free radical inhibitor, initiating reactant, and/or non-initiating lactide reactant used in this mechanism, if possible, should be biodegradable so that the resulting polylactide polymer does not lose its biodegradability. The amount of radical inhibitor varies with the reaction conditions. If too little radical inhibitor is added to the prepolymer mixture, then a significant portion of the bonds will not be protected. If too much radical inhibitor is added, then subsequent reaction may be difficult to initiate. The appropriate amount of inhibitor, for any given system, can be readily determined by one of skill, by experimentation. In general, an inhibitor concentration of about 0.01 to 1.0 weight percent, based on weight of the carbon—carbon double bond containing reactant is suitable.

Preparation of Improved Melt Stable Lactide Polymers

In general, lactide polymers according to the present invention are manufactured from the polymerization of lactide. Except for the improvements defined herein with respect to interacting long polymer chains for rheology improvement, general techniques for preparation of lactide polymers according to the present invention are disclosed in U.S. Pat. Nos. 5,142,023 and 5,247,059 to Gruber et al. Thus, the techniques described herein are well adapted for use in continuous processing and are not limited to use in batch processing. These techniques may be applied, with modifications as described herein, to obtain improved polymers according to the present invention.

In general, various techniques outlined above for generating interaction among linear polymers can be characterized as practiced in at least one of three general manners: by providing a reactant or initiator in the prepolymer mixture prior to polymerization; providing a reactant or initiator during lactide polymerization, or possibly by providing a reactant or initiator after lactide polymerization. An example of the first type of modification is the general technique of providing an initiating reactant in the prepolymer mixture. An example of the second technique is providing a non-initiating lactide reactant in the lactide mixture during polymerization. An example of the third technique is utilization of a free radical initiator to create polymer radicals which react to generate bonding between polymer molecules, after polymerization.

Melt-Stable Polymers Generally

The preferred lactide polymers of the present invention are melt-stable. By "melt-stable" it is meant generally that the lactide polymer, when subjected to melt-processing techniques, adequately maintains its physical properties and does not generate by-products in sufficient quantity to foul or coat processing equipment. The melt-stable lactide polymer exhibits reduced degradation relative to conventional lactide polymers. It is to be understood that degradation will occur during melt-processing. The compositional requirements and use of stabilizing agents reduces the degree of such degradation to a point where physical properties are not significantly negatively affected by melt-processing, and fouling by impurities or degradation by-products does not occur.

Furthermore, the melt-stable polymer should be melt-processable in melt-processing equipment such as that available commercially. Further, the polymer should retain molecular weight and viscosity. The polymer should have sufficiently low viscosity at the temperature of melt-processing so that the melt-processing equipment may mechanically, for example, extrude the lactide polymer in a polymer processing operation. The temperature at which this viscosity is sufficiently low should also be below a temperature at which substantial degradation occurs.

A standard test for determining whether a lactide polymer is melt-stable includes placing a small portion of a devolatilized sample of lactide polymer in a closed vial and placing such vial in a 180° C. oil bath. A sample is taken at times of 15 minutes and 1 hour. A melt-stable lactide polymer will show formation of less than 2 percent lactide in the 15-minute sample and, more preferably, formation of less than 2 percent lactide in the 1-hour sample. It is more preferable that the stabilized lactide polymer form lactide contents of less than 1 percent in both the 15-minute and 1-hour samples. At equilibrium there is a concentration of 3.6 weight percent lactide at 180° C.

The melt-stable lactide polymer composition may include other polymeric species which can, for example, be incorporated through melt blending. Examples of other polymers which could be blended include, but are not limited to, poly(hydroxybutyrate); poly(hydroxybutyrate-co-hydroxy valerate); poly(vinyl alcohol); poly(caprolactone); and, poly(glycolide). Preferably, the blended polymer is biodegradable, compostable, and made from annually renewable resources.

Polymer Composition

Preferred melt-stable lactide polymer compositions of the present invention comprise a mixture of polylactide polymer chains having a number average molecular weight from about 10,000 to about 300,000. More preferably, the number average molecular weight is at least 50,000. In still more preferred compositions, the number average molecular weight ranges from about 50,000 to about 150,000. In general, physical properties such as modulus, tensile strength, percentage elongation at break-impact strength, flexural modulus, and flexural strength remain statistically constant when the lactide polymer samples are above a threshold molecular weight. The lower limit of molecular weight of the polymer compositions of the present invention is preferably above about 50,000 in order to result in a lactide polymer with predictable physical properties upon melt-processing. There typically is a practical upper limit on molecular weight based on increased viscosity with increased molecular weight. In order to melt-process a high molecular weight lactide polymer, the melt-processing temperature should be increased to reduce the viscosity of the polymer. The exact upper limit on molecular weight should be determined for each melt-processing application in that required viscosities vary and residence time within the melt-processing equipment will also vary. Thus, the degree of degradation in each type of processing system will also vary. It is believed that one could determine the suitable molecular weight upper limit for meeting the viscosity and degradation requirements in any application.

Preferably, the polymer is prepared to have a weight average molecular weight of at least about 100,000 and not greater than 1,200,000. The melt-stable lactide polymer compositions in a preferred embodiment are dependent on the desired crystalline state of the product. For a semi-crystalline product the polymer compositions are the reaction product of polymerizing a lactide mixture comprising about 15% by weight or less of meso and D-lactide, with the balance L-lactide. More preferably, the reaction mixture will contain less than 6% by weight of meso and D-lactide, with a balance of L-lactide. For an amorphous product, the polymer compositions are generally the reaction product of polymerizing a lactide mixture comprising about 6% by weight or more of meso-and D-lactide, with a balance of L-lactide. More preferably, the reaction mixture will contain more than about 9% but less than about 50% by weight of meso-and D-lactide, with the balance L-lactide. The optical composition disclosed includes the benefit of utilizing meso-lactide as disclosed by Gruber et al. in U.S. application Ser. No. 07/955,690 which was filed on Oct. 2, 1992 which is hereby incorporated by reference.

In accord with the present invention, the prepolymer mixture (i.e. lactide monomer) may contain additional cyclic ester monomers along with lactide. For example, dioxanones (such as p-dioxanone), lactones (such as ε-caprolactone or 4-valerolactone), dioxan(dione)s (such as glycolide or tetramethyl 1,4-dioxan-2,5-dione), or ester-amides (such as morpholine-2,5-dione).

The residual monomer concentration (if any) in the preferred melt-stable lactide polymer composition is less than about 2 percent by weight. In a preferred composition the concentration of residual lactide monomer in the polymer is less than about 1 percent by weight and more preferably less than about 0.5 percent by weight. It has been found that the monomer should not be used as a plasticizing agent in the resin of the present invention due to significant fouling or plating out problems in processing equipment. It is believed that, typically, low levels of monomer concentration do not plasticize the final polymer.

The water concentration (if any) within the melt-stable lactide polymer composition preferably is less than about 2,000 parts-per-million. More preferably, this concentration is less than about 1000 parts-per-million and most preferably less than 500 parts-per-million. The polymer melt-stability is significantly affected by moisture content. Thus, the melt-stable polymer should have the water removed prior to melt-processing. It is recognized that water concentration may be reduced prior to processing the polymerized lactide to a resin. Thus, moisture control could be accomplished by packaging such resins in a way which prevents moisture from contacting the already-dry resin. Alternatively, the moisture content may be reduced at the melt-processor's facility just prior to the melt-processing step in a dryer. It has been found that the presence of water can cause excessive loss of molecular weight which may affect the physical properties of the melt-processed polymer.

In preferred compositions of the present invention, a stabilizing agent of a type and in an amount sufficient to reduce yellowing and molecular weight loss is included in the melt-stable composition. Stabilizing agents useful in the present polymer compositions comprise antioxidants and/or water scavengers. Preferred antioxidants are phosphite-containing compounds, hindered phenolic compounds or other phenolic compounds. Useful antioxidants include such compounds as trialkyl phosphates, mixed alkyl/aryl phosphates, alkylated aryl phosphates, sterically hindered aryl phosphates, aliphatic spirocyclic phosphates, sterically hindered phenyl spirocyclics, sterically hindered bisphosphonites, hydroxyphenyl propionates, hydroxy benzyls, alkylidene bisphenols, alkyl phenols, aromatic amines, thioethers, hindered amines, hydroquinones and mixtures thereof. Commercially-available stabilizing agents have been tested and fall within the scope of the present melt-stable lactide polymer composition. Biodegradable antioxidants are preferred.

The water scavengers which may be utilized in preferred embodiments of the melt-stable lactide polymer composition include: carbondimides, anhydrides, acyl chlorides, isocyanates, alkoxy silanes, and desiccant materials such as clay, alumina, silica gel, zeolites, calcium chloride, calcium carbonate, sodium sulfate, bicarbonates or any other compound which ties up water. Preferably the water scavenger is degradable or compostable.

In the manufacture of the melt-stable lactide polymer compositions of the present invention, the reaction to polymerize lactide is typically catalyzed. Many catalysts have been cited in literature for use in the ring-opening polymerization of actones. These include but are not limited to: $SnCl_2$, $SnBr_2$, $SnCl_4$, $SnBr_4$, aluminum alkoxides, tin alkoxides, zinc alkoxides, SnO, PbO, Sn (2-ethyl hexanoates), Sb (2-ethyl hexanoates), Bi (2-ethyl hexanoates), Na (2-ethyl hexanoates) (sometimes called octets), Ca stearates, Mg stearates, Zn stearates, and tetraphenyltin. Applicants have also tested several catalysts for polymerization of lactide at 180° C. which include: tin(II) bis(2-ethyl hexanoate) [T-9, Atochem], dibutyltin diacetate [Fascat 4200®, Atochem], butyltin tris(2-ethyl hexanoate) [Fascat 9102®, Atochem], hydrated monobutyltin oxide [Fascat 9100®, Atochem], antimony triacetate [S-21, Atochem], and antimony tris(ethylene glycoxide) [S-24, Atochem]. Of these catalysts, tin(II) bis(2-ethyl hexanoate), butyltin tris(2-ethyl hexanoate) and dibutyltin diacetate appear to be most effective.

It has been found that the use of catalysts to polymerize lactide significantly affects the stability of the resin product. It appears the catalyst as incorporated into the polymer also is effective at catalyzing the reverse depolymerization reaction. To minimize this negative effect, in preferred compositions, the residual catalyst level in the resin is present in a molar ratio of monomer-to-catalyst greater than 3,000:1, preferably greater than 5,000:1 and most preferably greater than 10,000:1. It is believed that a ratio of 20,000:1 may be used, but polymerization will be slow. It has been found that when catalyst level is controlled within these parameters, catalytic activity is sufficient to polymerize the lactide while sufficiently low to enable melt-processing without adverse effect when coupled with low residual monomer levels and low water concentration as described above in polymers of number average molecular weight between 10,000 to about 300,000. It is believed in most applications the addition of a stabilizing agent may be unnecessary if catalyst level is optimized.

It also has been found that catalyst concentration may be reduced subsequent to polymerization by precipitation from a solvent. This produces a resin with reduced catalyst concentration. In an alternative embodiment, the catalyst means for catalyzing the polymerization of lactide to form the polylactide polymer chains which was incorporated into the melt-stable lactide polymer composition during polymerization is deactivated by including in the melt-stable lactide polymer composition a catalyst deactivating agent in amounts sufficient to reduce catalytic depolymerization of the polylactide polymer chains. Such catalyst-deactivating agents include hindered, alkyl, aryl and phenolic hydrazides, amides of aliphatic and aromatic mono- and dicarboxylic acids, cyclic amides, hydrazones and bishydrazones of aliphatic and aromatic aldehydes, hydrazides of aliphatic and aromatic mono- and dicarboxylic acids, bis-acylated hydrazine derivatives, and heterocyclic compounds. A preferred metal deactivator is Irganox® MD1024 from Ciba-Geigy.

In an alternative embodiment, the catalyst concentration is reduced to near zero by utilizing a solid-supported catalyst to polymerize lactide. It is believed catalysts which may be utilized include supported metal catalysts, solid acid catalysts, acid clays, alumina silicates, alumina, silica and mixtures thereof.

A preferred melt-stable lactide polymer composition is the reaction product of polymerization of lactide at a temperature greater than about 160° C. Applicants have found that polymerization at higher temperatures results in a characteristically different polymer which is believed to have higher melt stability due to increased transesterification during polymerization.

If the lactide polymer composition is used as a coating, as detailed in pending U.S. Pat. No. 5,338,822 which was filed on Mar. 22, 1993 and is a continuation in part of U.S. application Ser. No. 07/955,690, the disclosure of which is hereby incorporated by reference, a plasticizer may be included in the polymer formulation in order to improve the coating quality of the polymer. More particularly, plasticizers reduce the glass transition temperature of poly(lactide), which aides in processing and coating the polymer at lower temperatures and may improve flexibility and reduce cracking tendencies of the coated product.

Selection of a plasticizing agent requires screening of many potential compounds and consideration of several criteria. For use in a biodegradable coating the preferred plasticizer is to be biodegradable, non-toxic, compatible with the resin and relatively nonvolatile.

Plasticizers in the general classes of alkyl or aliphatic esters, ether, and multi-functional esters and/or ethers are preferred. These include alkyl phosphate esters, dialkylether diesters, tricarboxylic esters, epoxidized oils and esters, polyesters, polyglycol diesters, alkyl alkylether diesters, aliphatic diesters, alkylether monoesters, citrate esters, dicarboxylic esters, vegetable oils and their derivatives, and esters of glycerine. Most preferred plasticizers are tricarboxylic esters, citrate esters, esters of glycerine and dicarboxylic esters. These esters are anticipated to be biodegradable. Plasticizers containing aromatic functionality or halogens are not preferred because of their possible negative impact on the environment.

For example, appropriate non-toxic character is exhibited by triethyl citrate, acetyltriethyl citrate, tri-n-butyl citrate, acetyltri-n-butyl citrate, acetyltri-n-hexyl citrate, n-butyryltri-n-hexyl citrate and dioctyl adipate.

Appropriate compatibility is exhibited by acetyltri-n-butyl citrate and triethyl citrate. Other compatible plasticizers include any plasticizers or combination of plasticizers which can be blended with poly(lactide) and are either miscible with poly(lactide) or which form a mechanically stable blend. Corn oil and mineral oil were found to be incompatible when used alone with poly(lactide) because of phase separation (not mechanically stable) and migration of the plasticizer.

Volatility is determined by the vapor pressure of the plasticizer. An appropriate plasticizer must be sufficiently non-volatile such that the plasticizer stays substantially in the resin formulation throughout the process needed to produce the coating. Excessive volatility can lead to fouling of process equipment, which is observed when producing films by melt processing poly(lactide) with a high lactide content. Preferred plasticizers should have a vapor pressure of less than about 10 mm Hg at 170° C., more preferred plasticizers should have a vapor pressure of less than 10 mm Hg at 200° C. Lactide, which is not a preferred plasticizer, has a vapor pressure of about 40 mm Hg at 170° C.

In a preferred composition for some applications, fillers may be useful to prevent blocking or sticking of the coated product during storage and transport. Inorganic fillers include clays an d minerals, either surface modified or not.

Examples include talc, silica, mica, kaolin, titanium dioxide, and wollastonite. Preferred inorganic fillers are environmentally stable and non-toxic. Some fillers, such as talc, have been found to act as nucleating agents, increasing the rate of crystallization.

Organic fillers include a variety of forest and agricultural products, either with or without modification. Examples include cellulose, wheat, starch, modified starch, chitin, chitosan, keratin, cellulosic materials derived from agricultural products, gluten, nut shell flour, wood flour, corn cob flour, and guar gum. Fillers may be used either alone or as mixtures of two or more fillers.

Surface treatments may also be used to reduce blocking. Such treatments include dusting the surface with materials which reduce the surface contact between the poly(lactide) based coating and the adjacent surface. Examples of materials which may be used in surface treatments include talc, silica, corn starch, corn meal, latex spheres or other particulates. Celite® Super Floss commercially available from Celite Corp. has been found to be effective.

For certain applications, it is desirable for the coating to have good slip properties. Lubricating solids such as fluoropolymer powders or graphite are sometimes incorporated into materials to increase slip properties. The fatty acid esters or hydrocarbon waxes commonly used as lubricants for the melt state, are gradually exuded, if used in very high concentrations, thus yielding to permanent lubricating effects. Certain additives migrate so strongly to the surface, even during cooling, that a uniform invisibly thin coating is formed. Thus, these slip agents may be important in the production of coatings which are used in automatic packaging machines.

Antistatic agents may be employed in the present invention. Antistatic agents are surfactants which can be subdivided into cationic, anionic, and nonionic agents.

Pigments or color agents may also be added as necessary. Examples include titanium dioxide, clays, calcium carbonate, talc, mica, silica, silicates, iron oxides and hydroxides, carbon black and magnesium oxide.

The resulting polylactide should also exhibit reduced neck-in when compared with linear non-functionalized polylactide of a comparable molecular weight. In order to determine whether the neck-in of the polylactide is reduced, any method well known in the art can be used. The following method is useable. A polylactide polymer film is extruded under the following conditions. An extruder with a suitable film die, for example, a one-inch extruder with a six-inch film die and chill roll stack, is used. The extruder is set at conditions suitable to produce an extrusion cast film using a linear polymer with a number average molecular weight comparable to the test polymer. The number average molecular weight of the linear polylactide should be within 20% of the less linear polylactide test sample. Typical die temperatures for polylactide are 160° C. to about 180° C. The extruder speed and take up roll speed are adjusted to produce a film of about 0.5 to about 3.0 mil thickness. The neck-in is determined as the die width minus the finished film width. The test polymer should be run at the same conditions as the linear control polymer, and the test sample's neck-in should be determined in the same manner. The neck-in ratio is the neck-in of the test sample (modified) polymer divided by the neck-in for the linear control polymer. Improvement of significance has occurred if a neck-in ratio of less than about 0.8 is obtained. Preferred improvement has resulted if the neck-in ratio is less than about 0.4.

Melt-Stable Lactide Polymer Process

The process for the manufacture of a melt-stable lactide polymer comprises the steps of first providing a purified lactide mixture, such as that produced in the process disclosed by Gruber et al. in U.S. Pat. Nos. 5,247,059 and 5,244,073, although the source of lactide is not critical to the process of the present invention.

The lactide mixture is polymerized to form a lactide polymer or polylactide with some residual unreacted monomer in the presence of a catalyst means for catalyzing the polymerization of lactide to form polylactide. Catalysts suitable for such polymerization have been listed previously. The concentration of catalysts utilized may be optimized as discussed previously.

In a preferred embodiment, a stabilizing agent as disclosed above, which may be an antioxidant and/or a water scavenger is added to the lactide polymer. It is recognized that such stabilizing agents may be added simultaneously with or prior to the polymerization of the lactide to form the lactide polymer. The stabilizing agent may also be added subsequent to polymerization.

The lactide polymer is then devolatilized to remove unreacted monomer which may also be a by-product of decomposition reactions or the equilibrium-driven depolymerization of polylactide. Any residual water which may be present in the polymer would also be removed during devolatilization, although it is recognized that a separate drying step may be utilized to reduce the water concentration to less than about 1,000 parts-per-million. The devolatilization of the lactide polymer may take place in any known devolatilization process. The key to selection of a process is operation at an elevated temperature and usually under conditions of vacuum to allow separation of the volatile components from the polymer. Such processes include a stirred tank devolatilization or a melt-extrusion process which includes a devolatilization chamber and the like.

In a preferred process for manufacture of a melt-stable lactide polymer composition, the process also includes the step of adding a molecular weight control gent to the lactide prior to catalyzing the polymerization of the lactide. Molecular eight control agents include active hydrogen-bearing compounds, such as lactic acid, esters of lactic acid, alcohols, amines, glycols, diols and triols which function as chain-initiating agents. Such molecular weight control agents are added in sufficient quantity to control the number average molecular weight of the polylactide to between about 10,000 and about 300,000.

Next referring to FIG. 1 which illustrates a preferred process for producing a melt-stable lactide polymer composition. A mixture of lactides enters a mixing vessel (3) through a pipeline (1). A catalyst for polymerizing lactide is also added through a pipeline (13). Within mixing vessel (3) a stabilizing agent may be added through a pipeline (2). A water scavenger may also be added through the pipeline (2). The stabilized lactide mixture is fed through a pipeline (4) to a polymerization process (5) which may be conducted at temperatures greater than 160° C. The polymerized lactide or lactide polymer leaves the polymerization process through a pipeline (6). The stream is fed to a second mixing vessel (8) within which a stabilizing agent and/or catalyst deactivating agent may be added through a pipeline (7). The stabilized lactide polymer composition is then fed to a devolatilization process (10) through a pipeline (9). Volatile components leave the devolatilization process through a pipeline (11) and the devolatilized lactide polymer composition leaves the devolatilization process (10) in a pipeline (12). The devolatilized lactide composition is fed to a resin-finishing process (14). Within the resin-finishing process the polymer is solidified and processed to form a pelletized or granular resin or bead. Applicants recognize the polymer may be solidified and processed to form resin or bead first, followed by devolatilization. The resin is then fed to a drying process (16) by conveyance means (15). Within the drying process (16) moisture is removed as a vapor through pipeline (17). The dried lactide polymer resin leaves the drying process (16) by a conveyance means (18) and is fed to a melt-processing apparatus (19). Within the melt-processing apparatus (19) the resin is converted to a useful article as disclosed above. The useful article leaves the melt-processing apparatus (19) through a conveyance means (20). The process illustrated in FIG. 1 can be readily conducted as a continuous process.

The various agents (for example, radical initiators, non-initiating reactants or initiating reactants) useable to provide the improved polymers as discussed herein may be added at various points in the process. For example, at mixing vessel 3, in the polymerization reactor, at vessel 8, in devolatilize 10, or in subsequent processing steps.

One example of a useful article, is a coated paper article. A typical method of coating paper, as disclosed in U.S. application Ser. No. 08/034,099, which was filed on Mar. 22, 1993 and which is hereby incorporated by reference, is by extruding a melt through a die onto a moving substrate. After the coating process, the paper may be calendared to improve surface properties such as smoothness and gloss. In the calendaring process, the coated paper passes through alternating hard and soft rolls which reform the surface, often producing a gloss while smoothing or leveling surface face contours.

EXAMPLES

Examples 1 through 10 and 16–18 disclose methods and compositions utilizing a non-initiating lactide reactant as discussed previously with respect to configurations (5)–(8). Examples 11–15 disclose methods and compositions utilizing peroxides and free radical reaction, as previously discussed. In the examples, Mn=number average molecular weight as determined by gel permeation chromatography (GPC); Mw=weight average molecular weight by GPC. Mz is the sum of the product of the number of molecules of a molecular weight times the cube of that molecular weight, divided by the sum of the number of molecules of a molecular weight times the square of that molecular weight.

Example 1

Copolymerization of Lactide with Epoxidized Soybean Oil and Epoxidized Tall Oil Epoxidized soybean oil (FLEXOL® EPO, commercially available from Union Carbide) and epoxidized tall oil (FLEXOL® E EP8, commercially available from Union Carbide) were separately copolymerized with lactide. A phosphite based process stabilizer (Weston TNPP, commercially available from General Electric) was added to the lactide at 0.4 weight percent. Catalyst (2-Ethylhexanoic acid, tin(II) salt from Aldrich Co., Milwaukee, Wis.) in a tetrahydrofuran carrier was added in a molar ratio 1 part catalyst/10,000 parts lactide. Mixtures of the molten lactide, epoxidized oil, stabilizer, and catalyst were sealed in vials and polymerized at 180° C. for 2.5 hours. The samples were then dissolved in chloroform and analyzed by gel permeation chromatography using a refractive index detector and Ultrastyragel® IR column from Waters Chromatography to determine weight average and number average molecular weights for the resulting copolymer resins. The system temperature was 35° C. and the GPC column was calibrated against poly(styrene) standards. The results of these tests appear in Table 1.

TABLE 1

| Sample | Weight Average Mol. Weight | % Conversion |
|---|---|---|
| control poly(lactide) | 240,000 | 71 |
| copolymerized with 1.0 wt % epoxidized soybean oil | 400,000 | 96 |
| copolymerized with 1.5 wt % epoxidized tall oil | 178,000 | 96 |

The results for the epoxidized soybean oil show a significant increase in the weight average molecular weight, indicative of a coupling or crosslinking mechanism during the copolymerization. This is attributed to the multiple oxirane functionality contained in most of the epoxidized soybean oil molecules (an average of about 4.6 oxirane oxygens/molecule). The epoxidized tall oil copolymer does not show an increase in weight average molecular weight, presumably because each of the tall oil molecules contain an average of only about 1 oxirane group. The results for both the epoxidized tall oil and the epoxidized soybean oil show an increase in reaction rate for the copolymerization, achieving 96% conversion of the monomers, while the control reaction only exhibited 71% conversion.

Example 2

Examples of Epoxidized Linseed Oil as a Copolymerizing Agent

A copolymerized poly(lactide) was produced by adding epoxidized linseed oil to a continuous pilot plant polymerization of lactide in the same manner described in Example 1. This was accomplished by adding a solution of TNPP and epoxidized linseed oil (FLEXOL® Plasticizer LOE from Union Carbide), in a ratio of 1:2 by weight, at a rate of 10 gm/hr to the continuous polymerization such that the weight ratio of epoxidized oil to lactide was 0.55. Lactic acid was processed into lactide in a continuous pilot scale reactor, purified by distillation, and fed to a continuous polymerization reactor system. The polymerization system consisted of a 1-gallon and a 5-gallon reactor in series. The reactors are continuous feed, stirred tank reactors. The lactide feed rate was 1.1 kg/hr, the catalyst, tin (II) bis(2-ethyl hexanoate) (T-9 from Atochem) was added at a rate of 0.03 weight percent. A phosphite process stabilizer (Weston TNPP® from General Electric) was added at a rate of 0.3 weight percent. Reactor temperatures were 190° C. to 200° C. The resulting polymer pellets were bagged every eight hours and labelled as samples I–VII. The pellets were dried and collected for GPC analysis. Total run time was 52 hours generating 60 kilograms material.

GPC results after drying:

TABLE 2

| Example | Time | Mn | Mw | PDI |
|---|---|---|---|---|
| start | zero | 89000 | 220000 | 2.5 |
| I | 0–8 hours | 79000 | 307000 | 2.9 |
| II | 8–16 hours | 50000 | 296000 | 5.0 |
| III | 16–24 hours | 72200 | 323000 | 4.4 |
| IV | 24–32 hours | 80900 | 339000 | 4.2 |
| V | 32–40 hours | 81500 | 316000 | 3.9 |

TABLE 2-continued

| Example | Time | Mn | Mw | PDI |
|---|---|---|---|---|
| VI | 40–48 hours | 76200 | 303000 | 4.0 |
| VII | 48–52 hours | 81600 | 319000 | 4.0 |

The resulting material was then subjected to a devolatilization process to remove the residual amount of unreacted monomer lactide. After devolatilization, samples III–VII were combined and used in further testing. Molecular weights of the combined fractions after devolatilization were: Mn-75,000 Mw-325000 PDI-4.3 and a residual lactide level of less than 0.5 percent as recorded by a GPC.

Example 3

Example of Vial Polymerizations with Epoxidized Oil, Showing Effect on Rate of Polymerization Tin(II) bis (2-ethylhexanoate) commercially available as 2-ethylhexanoic acid, tin(II) salt from Aldrich Chemical Company, and epoxidized linseed oil (FLEXOL® Plasticizer LOE from Union Carbide) were placed into a vial. A molten mixture of 90% L-lactide and 10% D,L-lactide, with 0.4% by weight of a stabilizer (Weston TNPP), was then added to the vial. An identical set was made up without the epoxidized oil. In each case the final catalyst concentration was 1 part catalyst per 5000 parts lactide and the epoxidized oil was 1% by weight of the final reaction mixture. The solutions were sealed and placed in an oil bath at 180° C. Samples were pulled over time and analyzed by GPC for molecular weight and extent of lactide conversion.

The experiment was repeated, except that the catalyst and the epoxidized oil were added to the molten lactide before it was placed in the respective vials.

The results of both experiments are shown in Tables 3 and 4 respectively. The epoxidized oil resulted in an increase in the polymerization reaction ate in each study. The weight average molecular weight and PDI (polydispersion index) are also higher.

TABLE 3

| Sample | Time (min.) | % Conversion | Mn | Mw | PDI |
|---|---|---|---|---|---|
| Control | 15 | 10 | 6800 | 7800 | 1.12 |
|  | 30 | 16 | 39100 | 40600 | 1.04 |
|  | 45 | 48 | 30400 | 40100 | 1.32 |
|  | 60 | 73 | 48900 | 77800 | 1.59 |
|  | 90 | 78 | 54000 | 86200 | 1.60 |
| With 1% epoxidized oil | 15 | 12 | 7800 | 8800 | 1.12 |
|  | 30 | 69 | 57100 | 115000 | 2.01 |
|  | 45 | 74 | 50500 | 112000 | 2.22 |
|  | 60 | 80 | 67300 | 123000 | 1.82 |
|  | 90 | 93 | 78400 | 176000 | 2.25 |

TABLE 4

| | Time (min.) | % Conversion | Mn | Mw | PDI |
|---|---|---|---|---|---|
| Control | 15 | 0 | — | — | — |
|  | 30 | 8 | 5400 | 5700 | 1.05 |
|  | 45 | 18 | 14500 | 16500 | 1.14 |
|  | 60 | 28 | 26400 | 29000 | 1.10 |
|  | 90 | 45 | 26900 | 29000 | 1.15 |
| With 1% epoxidized oil | 15 | 11 | 7500 | 8800 | 1.17 |
|  | 30 | 32 | 24700 | 29700 | 1.22 |
|  | 45 | 57 | 31300 | 44000 | 1.40 |
|  | 60 | 69 | 50300 | 71000 | 1.41 |
|  | 90 | 84 | 53500 | 96400 | 1.80 |

TABLE 4-continued (merged above)

Example 4

Cast Film at Typical Extrusion Temperatures

Films of a control polymer and a copolymer of the present invention were extruded. The conditions and the results follow:

Extruder

Equipment: Killion 1" extruder 30/1 L/D rate with a 6" cast sheet displaced about ½ inch from a three stack chill roll. The following were the temperatures (°F.):

| Zone 1 | Zone 2 | Zone 3 | Zone 4 | Adapter | Die | Melt | Chill Roll |
|---|---|---|---|---|---|---|---|
| 300 | 330 | 350 | 350 | 335 | 330 | 340 | 100 |

TABLE 5

Cast film results:
Base PLA (Mn = 70,000; Mw = 215,000)

| Power (amps) | Screw Speed (rpm) | Press (psi) | Take Off Setting | Thickness (mils) | Width (inches) | Neck-in (inches) |
|---|---|---|---|---|---|---|
| 12.5 | 40 | 3840 | 2.0 | 17.0 | 5.125 | 0.875 |
| 12.5 | 40 | 3840 | 4.0 | 8.0 | 4.625 | 1.375 |
| 12.5 | 40 | 3840 | 6.0 | 5.5 | 4.375 | 1.625 |
| 12.5 | 40 | 3840 | 8.0 | 4.0 | 4.250 | 1.75 |
| 12.5 | 40 | 3840 | 10.0 | 2.5 | 4.0 | 2.0 |
| 12.0 | 30 | 3610 | 10.0 | 1.5 | 4.0 | 2.0 |
| 11.5 | 20 | 3380 | 10.0 | 1.0 | 3.75 | 2.25 |
| 11.5 | 10 | 2850 | 10.0 | 0.7 | 3.75 | 2.25 |

TABLE 6

PLA w/epoxidized linseed oil (Mn = 75,000; Mw = 325,000)

| Power (amps) | Screw Speed (rpm) | Press (psi) | Take Off Setting | Thickness (mils) | Width (inches) | Neck-in (inches) |
|---|---|---|---|---|---|---|
| 5.5 | 40 | 1950 | 2.0 | 12.0 | 5.0 | 1.0 |
| 5.0 | 40 | 1950 | 4.0 | 8.5 | 5.0 | 1.0 |
| 5.0 | 40 | 1950 | 6.0 | 5.5 | 4.75 | 1.25 |
| 5.0 | 40 | 1950 | 8.0 | 4.0 | 4.75 | 1.25 |
| 5.0 | 40 | 1950 | 10.0 | 3.5 | 4.75 | 1.25 |
| 5.0 | 30 | 1650 | 10.0 | 2.0 | 4.75 | 1.25 |
| 5.0 | 20 | 1250 | 10.0 | 1.0 | 4.75 | 1.25 |
| 4.5 | 10 | 880 | 10.0 | 0.5 | 4.75 | 1.25 |

The results show that poly(lactide) co-polymerized with epoxidized linseed oil processes at lower power consumption and pressure, and generates a polymer with reduced neck-in.

Example 5

Cast Film at Reduced Extrusion Temperatures

Separate films made from a poly(lactide) control polymer and from the copolymer of the present invention described in Example 2 were extruded under various conditions. The resulting films were then evaluated using standard measuring techniques. The extruding conditions and the data gathered from this evaluation are set forth below:
Extruder Temperatures (°F.) of:

| Zone 1 | Zone 2 | Zone 3 | Zone 4 | Adapter | Die | Melt | Chill Roll |
|---|---|---|---|---|---|---|---|
| 285 | 295 | 305 | 305 | 305 | 305 | 305 | 100 |

TABLE 7

Cast film results:
PLA w/epoxidized linseed oil

| Power (amps) | Screw Speed (rpm) | Press (psi) | Take Off Setting | Thickness (mils) | Width (inches) | Neck-in (inches) |
|---|---|---|---|---|---|---|
| 10.5 | 40 | 3470 | 2.0 | 10.0 | 5.125 | 0.875 |
| 10.0 | 40 | 3470 | 4.0 | 6.0 | 5.125 | 0.875 |
| 10.0 | 40 | 3470 | 6.0 | 4.0 | 5.125 | 0.875 |
| 10.0 | 40 | 3470 | 8.0 | 3.5 | 5.0 | 1.0 |
| 10.0 | 10 | 3470 | 10.0 | 2.5 | 5.0 | 1.0 |
| 7.5 | 30 | 3250 | 10.0 | 1.5 | 5.0 | 1.0 |
| 6.0 | 20 | 2720 | 10.0 | 0.7 | 5.0 | 1.0 |
| 6.0 | 10 | 2000 | 10.0 | 0.5 | 5.125 | 0.875 |
| 2.5 | 4.5 | 1450 | 10.0 | 0.25 | 5.25 | 0.75 |
| 2.5 | 1.0 | 920 | 10.0 | 0.1 | 5.25 | 0.75 |

Under similar extrusion temperatures, the control poly (lactide) could not run because the power consumption exceeded maximum levels (>15 amps). The results show that poly(lactide) polymerized with epoxidized linseed oil has the benefit of processing at lower temperatures and generates a polymer with increased melt strength, less neck-in and a film of lower thickness.

Example 6

Blown Film of Base Poly(lactide) with Epoxidized Linseed Oil

A copolymer of lactide with epoxidized linseed oil was prepared in the manner described in Example 2 and was blown into a 8 inch width film at thickness from 3.0 to 0.5 mils. The blown film line consisted of a Killion tower connected to a Killion 1" extruder 30:1 L/D ratio equipped with a 2.25 inch blown film die. Distance from the die to the towers nip roll was 2.5 feet.

TABLE 8

Extruder Temperatures (°F.):

| Zone 1 | Zone 2 | Zone 3 | Zone 4 | Adapter | Die | Melt | Chill Roll |
|---|---|---|---|---|---|---|---|
| 300 | 320 | 330 | 325 | 310 | 310 | 310 | 320 |

Operation of the blown film line was very smooth.

Example 7

Use of Hydroxyl Initiators and Effect on Molecular Weight

L-lactide was melted under nitrogen and catalyst [tin (II) bis 2-ethylthexanoate, 1:5000 molar ratio of tin to lactide] was added. Initiator was added at the rate of 1:500 molar basis, initiator to lactide. The samples were polymerized at 80° C. for 2 hours. Samples were then ground and devolatilized at 125° C. and 10 mmHg pressure overnight. Samples were reground, dissolved in chloroform, and analyzed by gel permeation chromatography (GPC) against polystyrene standards. The results are shown below:

| Initiator | Mn | Mw | PDI |
|---|---|---|---|
| Dodecanol | 54,800 | 113,000 | 2.06 |
| 2-EHMPD | 55,400 | 95,000 | 1.72 |
| Dipentaerythritol | 56,400 | 93,600 | 1.66 |

2-EHMPD is 2-ethyl-2-(hydroxy methyl)-1,3-propane diol. The number average molecular weights are consistent with the expected values for adding hydroxyl initiators. The low PDI (PDI<2) are consistent with the most probable distribution for multi-functional initiators. The PDI are lower than the PDI of about 2.0 which is typically seen for vial polymerization of lactide.

Example 8

Lactide/Epoxidized Soybean Oil Copolymerization

Lactide was copolymerized with epoxidized soybean oil in a continuous pilot line. The feed contained 0.25 weight percent epoxidized soybean oil [Paraplex G-62; C. P. Hall], 0.1 weight % PNPG process stabilizer [Weston], and 0.03 weight percent catalyst (tin II) bis (2-ethyl hexanoate). Two back-mixed reactors in series (1 gallon and 5 gallon) were used. The reaction temperature was about 215° C., and the reactors were about 75% full.

The copolymer had a number average molecular weight of about 70,000 and a weight average molecular weight of about 210,000, giving a PDI of about 3.0. Under similar conditions, but without the epoxidized oil, the pilot line produced poly(lactide) with a PDI of 2.1–2.5 and comparable number average molecular weight.

Example 9

Neck-in on Cast Film Using Epoxidized Soybean Oil Modified PLA

A performance comparison for extruding a cast sheet was made using normal, linear poly(lactide) and the less linear poly(lactide) copolymerized with epoxidized soybean oil) from Example 8. The test was conducted using a 1" Killion extruder with 30/1 L/D connected to a 6" cast sheet die. The die was approximately ½ inch from a three roll chill stack. The extruder die temperature was 345° F. and the chill roll was 100° F. The following table presents the measured power usage, die pressure, and film neck-in (die width—minimum sheet width) for base poly(lactide) and the modified polymer. The take-off setting was held constant.

| Base Poly(lactide) | | | | | Modified Poly(lactide) | | | |
|---|---|---|---|---|---|---|---|---|
| Screw Speed (rpm) | Approx Thick (mil) | Power (amps) | Press (psi) | Neck-in (inches) | Power (amps) | Press (psi) | Neck-in (inches) | Neck-in ratio |
| 40 | 3 | 15 | 1260 | 1.75 | 8 | 785 | 0.7 | 0.40 |
| 30 | 2 | 12.5 | 1090 | 1.75 | 8 | 650 | 0.9 | 0.51 |
| 20 | 1.5 | 12.5 | 860 | 1.75 | 7.5 | 510 | 1.0 | 0.57 |
| 10 | 0.8 | 10.5 | 560 | 2.0 | 6.0 | 300 | 1.0 | 0.50 |
| 5 | 0.5 | 7.0 | 280 | 3.25 | 6.0 | 190 | 1.25 | 0.38 |

The modified polymer shows benefits, at all screw speeds, of reduced power consumption, reduced die pressure, and reduced neck-in.

Example 10

Curtain Coating with Epoxidized Soybean Oil Modified PLA

A comparison of linear poly(lactide) and modified poly(lactide) copolymer from Example 8 was made on an extrusion curtain coating line. The linear poly(lactide) had a number average molecular weight of 95,000 with a PDI of 2.34, and the modified polymer had a number average molecular weight of 70,000 and PDI of 3.08.

The extrusion curtain coating line consisted of a 1.5" extruder with a 24:1 L/D, connected to a vertical 13" coat hanger die. The extruder was run with a die temperature of 425° F. The polymer was coated onto 15 pound basis weight kraft paper at a speed of 150 feet per minute. The die was held 3" above the substrate. The polymer through-put was varied using the screw speed of the extruder to produce coatings of various thicknesses. The table below shows the power consumption, coating thickness, and amount of neck-in (die width—minimum coating width) at various screw speeds.

| | Linear Poly(lactide) | | | Modified Poly(lactide) | | |
|---|---|---|---|---|---|---|
| Screw Speed (rpm) | Power (amps) | Thick (mil) | Neck-in (inch) | Power (amps) | Thick (mil) | Neck-in (inch) |
| 90 | 15 | 1.5 | 4 | 10 | 1.5 | 1.0 |
| 60 | 12 | 1.0 | 5 | 5 | 1.0 | 1.5 |
| 45 | 12 | 0.6 | 5 | 4 | 0.5 | 2.0 |
| 30 | 10 | 0.4 | 5 | 4 | 0.4 | 2.0 |

The linear polymer exhibited a very uneven coating action, with the edge of the coating weaving in and out to make a coating of uneven width. Both materials showed excellent adhesion to the paper and produced coatings free of tears or gels.

Example 11

Peroxide Treatment of Plasticized Poly(Lactide)

Poly(lactide) with 10.5 weight percent acetyl tri-n-butyl citrate as a plasticizer was blended with 0.25% and 0.5% dicumyl peroxide. The peroxide was misted onto the pellets as a 50% solution in acetone, followed by vacuum drying at room temperature for 3 hours to remove the acetone. The pellets were then injection molded at 180 C. with a hold time of 4.5 minutes. Molecular weights were determined by GPC. Gel content was determined as the residue remaining after dissolving at 1% in refluxing acetone for 3 hours and filtering. The table below shows the change in molecular weight profile after treatment. The increase in high molecular weight components is consistent with bridging due to peroxide induced crosslinking.

| | Control | 0.25% treated | 0.50% treated |
|---|---|---|---|
| Mn | 64,000 | 87,000 | 82,000 |
| Mw | 170,000 | 326,000 | 456,000 |
| Mz | 376,000 | 1,162,000 | 1,184,000 |
| PDI | 2.65 | 3.73 | 5.49 |
| % gel | 0.0% | 1.5% | 2.1% |

The 0.25% treated sample was slightly hazy, the 0.5% treated sample was dull and hazy. Material properties of glass transition temperature, melting point, annealed percent crystallinity, break stress, modulus, and heat distortion temperature were unchanged.

Example 12

Peroxide Treatment/Neck-in on Cast Films

Poly(lactide) pellets were coated with 0.2 weight percent of either Lupersol 101 or Lupersol TBEC (ELF Atochem) and processed in an extruder to make an extrusion cast film using a 6" die. The die temperature of the extruder was 335° F. with a residence time of about 4 minutes. The table below presents molecular weight distributions as determined by GPC and gel content as measured by acetone insolubles.

| | Base | TBEC Modified | 101 Modified |
|---|---|---|---|
| Mn | 66,900 | 74,400 | 67,600 |
| Mw | 161,000 | 200,000 | 184,000 |
| Mz | 306,000 | 423,000 | 376,000 |
| PDI | 2.40 | 2.69 | 2.73 |
| % gel | 0.0% | 1.0% | 0.0% |

All films were clear (non-hazy).

The neck-in was determined as the die width minus the film width.

| Thick | | Neck-in and neck-in ratio | | | |
|---|---|---|---|---|---|
| (mil) | Base | TBEC | (ratio) | 101 | (ratio) |
| 0.5 | 2.5 | 1.2 | 0.48 | 1.2 | 0.48 |
| 1.0 | 2.4 | 1.2 | 0.50 | 1.2 | 0.50 |

Example 13

Peroxide Treatment/Neck-in on Cast Films

A blend of plasticizer (acetyl tri-n-butyl citrate) and peroxide (ethyl 3,3-bis-(t-butylperoxy)-butyrate)

(commercially available is Luperco 233XL from ELF Atochem was compounded with poly(lactide) and 4 weight % Celite Super Floss (Celite) diatomaceous earth using a Leistritz twin screw extruder. The material was pelletized and dried, with molecular weights as shown below.

| Sample | % peroxide | % plasticizer | Mn | Mw | PDI |
|---|---|---|---|---|---|
| 1 | 0.0 | 0.0 | 77,000 | 165,000 | 2.13 |
| 2 | 0.10 | 20 | 86,500 | 197,000 | 2.28 |
| 3 | 0.25 | 15 | 81,800 | 219,000 | 2.68 |
| 4 | 0.50 | 20 | 72,300 | 261,000 | 3.61 |
| 5 | 1.00 | 15 | 61,400 | 243,000 | 3.96 |
| 6 | 1.00 | 20 | 71,800 | 275,000 | 3.83 |

The increase in high molecular weight components, as seen in the Mw and the PDI, with increasing peroxide level is clearly evident.

Samples were tested for neck-in under extrusion cast film conditions using a 6" extrusion die. The neck-in is measured as the width of the die (6") minus actual sheet width (inches). The following values were obtained as a function of extruder screw speed.

| Screw Speed | Thick (mil) | Neck-in (inches) | | | | Neck-in ratio | | |
|---|---|---|---|---|---|---|---|---|
| | | Film 1 | Film 3 | Film 4 | Film 6 | Film 3 | Film 4 | Film 6 |
| 40 | 3.0 | 1.96 | 1.28 | 0.50 | 0.41 | 0.65 | 0.26 | 0.21 |
| 30 | 2.0 | 2.06 | 1.15 | 0.50 | 0.34 | 0.56 | 0.24 | 0.17 |
| 20 | 1.5 | 2.13 | 1.31 | 0.56 | 0.25 | 0.61 | 0.26 | 0.26 |
| 10 | 0.8 | 2.35 | 1.19 | 0.38 | | 0.51 | 0.16 | |
| 5 | 0.4 | 2.90 | 1.19 | 0.31 | | 0.41 | 0.11 | |

Increasing peroxide clearly reduced neck-in at all screw speeds.

The following amps and die pressure were measured at various screw speeds. Melt temperature for all tests was 165°–172° C.

Amps during sheet extrusion:

| Screw Speed (rpm) | Amps | | | | |
|---|---|---|---|---|---|
| | Film 1 | Film 3 | Film 4 | Film 5 | Film 6 |
| 40 | 14.5 | 7 | 4.5 | 7 | 3.5 |
| 30 | 14 | 6.5 | 4 | 5.5 | 3 |
| 20 | 13 | 6 | 3.2 | 3.5 | 2.8 |
| 10 | 11 | 5 | 2.8 | 3 | |
| 5 | 8.5 | 3 | 2 | | |

Die pressure during sheet extrusion:

| Screw Speed (rpm) | Die Pressure (psi) | | | | |
|---|---|---|---|---|---|
| | Film 1 | Film 3 | Film 4 | Film 5 | Film 6 |
| 40 | 1150 | 800 | 720 | 920 | 730 |
| 30 | 970 | 680 | 640 | 770 | 600 |
| 20 | 770 | 560 | 530 | 630 | 480 |
| 10 | 495 | 400 | 380 | 490 | |
| 5 | 310 | 300 | 270 | | |

The large drop in amps and die pressure between film 1 and the others is presumably due to the addition of plasticizer in the other formulations. To see the effect of peroxide, we compare films 3 and 5 (0.25% and 1%) peroxide at constant 15% plasticizer) and films 4 and 6 (0.50% and 1% peroxide at constant 20% plasticizer). The peroxide seems to have caused a slight decrease in amperage but uncertain (possible increase) effect on die pressure.

Example 14

Peroxide Treatment/Blown Film Results

Samples 3, 4, 5 and 6 from Example 13 were blown into 2 mil film using a Killion extruder with a 2.25" blown film die and a Killion tower. The materials formed blown films with less difficulty than linear poly(lactide). Film properties from tensile and trouser tear test results are shown below. The tensile test is provided in ASTM D882 and the trouser tear test is exemplified by ASTM D1938.

| Sample | % elong. at yield | % elong. break | tensile break energy (in – lb) | tear break energy (in – lb) |
|---|---|---|---|---|
| 3 | 6.7 | 10 | 1.4 | 0.30 |
| 5 | 3.6 | 4 | 1.2 | 0.28 |
| 6 | 8.1 | 368 | 70.4 | 0.15 |
| 4 | 11.5 | 491 | 78.0 | 0.23 |

Example 15

Effect of Peroxide Treatment on Shear Viscosity as Determined by Capillary Rheometry A series of polymers, with 15% plasticizer and various levels of peroxide (Luperco 233XL), prepared in a manner similar to those in Example 13 were tested using a capillary viscometer at a temperature of 175° C. The viscosity data are shown in the table below.

| Material | Shear rate | Apparent Shear Viscosity (Pa – S) | | |
|---|---|---|---|---|
| | | 500/sec | 1000/sec | 5000/sec |
| 0.1% peroxide | | 198 | 95 | 26 |
| 0.25% peroxide | | 258 | 118 | 33 |
| 1.0% peroxide | | 267 | 123 | 39 |

The data show that at increasing levels of peroxide the apparent shear viscosity increases. This is consistent with increased molecular weight due to bridging.

Example 16

Intrinsic Viscosity vs. Molecular Weight Data

A series of linear non-functionalized poly(lactide) samples were prepared using vial polymerizations with lactic acid added as a molecular weight control agent. These samples were dried and devolatilized, then dissolved in chloroform for GPC molecular weight determination (relative to polystyrene standards) and for intrinsic viscosity (IV). Both the GPC and the intrinsic viscosity were carried out at 35° C. The intrinsic viscosity measurements were made at three or more concentration points and extrapolated to zero concentration, following standard procedure.

A branched poly(lactide) copolymer with epoxidized linseed oil, from Example 2, was also tested in this manner.

The results are shown in FIG. 2, where ln(IV) is plotted vs ln(apparent weight average mol weight). (I.V. is measured in deciliters/gram.) For typical poly(lactide), with a PDI of about 2, all the points are expected to fall on a single line, determined by the Mark-Houwink constants. A branched polymer, with sufficiently long arms, is expected to have a smaller radius of gyration and exhibit a lower intrinsic viscosity at a given molecular weight. The figure shows intrinsic viscosity relative to apparent molecular weight, which in this case is equivalent to GPC retention time and therefore to hydrodynamic volume. It can be shown that a branched polymer, because of its smaller radius of gyration, has a higher molecular weight and lower IV at a given hydrodynamic volume. The point for the modified polymer is an example of this.

Each of the linear poly(lactides) falls within 0.07 units of the ln(IV) vs ln (apparent weight average mol weight) line. The modified polymer is 0.5 units lower than predicted by that line. According to the test described above, this is an example of a poly(lactide) with long chain branching and thus increased molecular interaction.

Example 17

Comparison of Copolymerized Epoxidized Oil with Blending of Epoxidized Oil

Polymer samples of base poly(lactide), base poly(lactide) compounded in an extruder with 0.2% and 0.5% epoxidized soybean oil (ESO), and a copolymer of poly(lactide) with about 0.3% epoxidized soybean oil were tested for apparent shear viscosity using a capillary viscometer. Molecular weight data, determined by gel permeation chromatography, are shown below.

| Sample | Mn | Mw | PDI |
|---|---|---|---|
| Base poly(lactide) | 76,000 | 176,000 | 2.3 |
| Base + 0.2% ESO | 70,000 | 158,000 | 2.3 |
| Base + 0.5% ESO | 66,000 | 151,000 | 2.3 |
| Copolymer | 50,000 | 213,000 | 4.8 |

Figure 3:
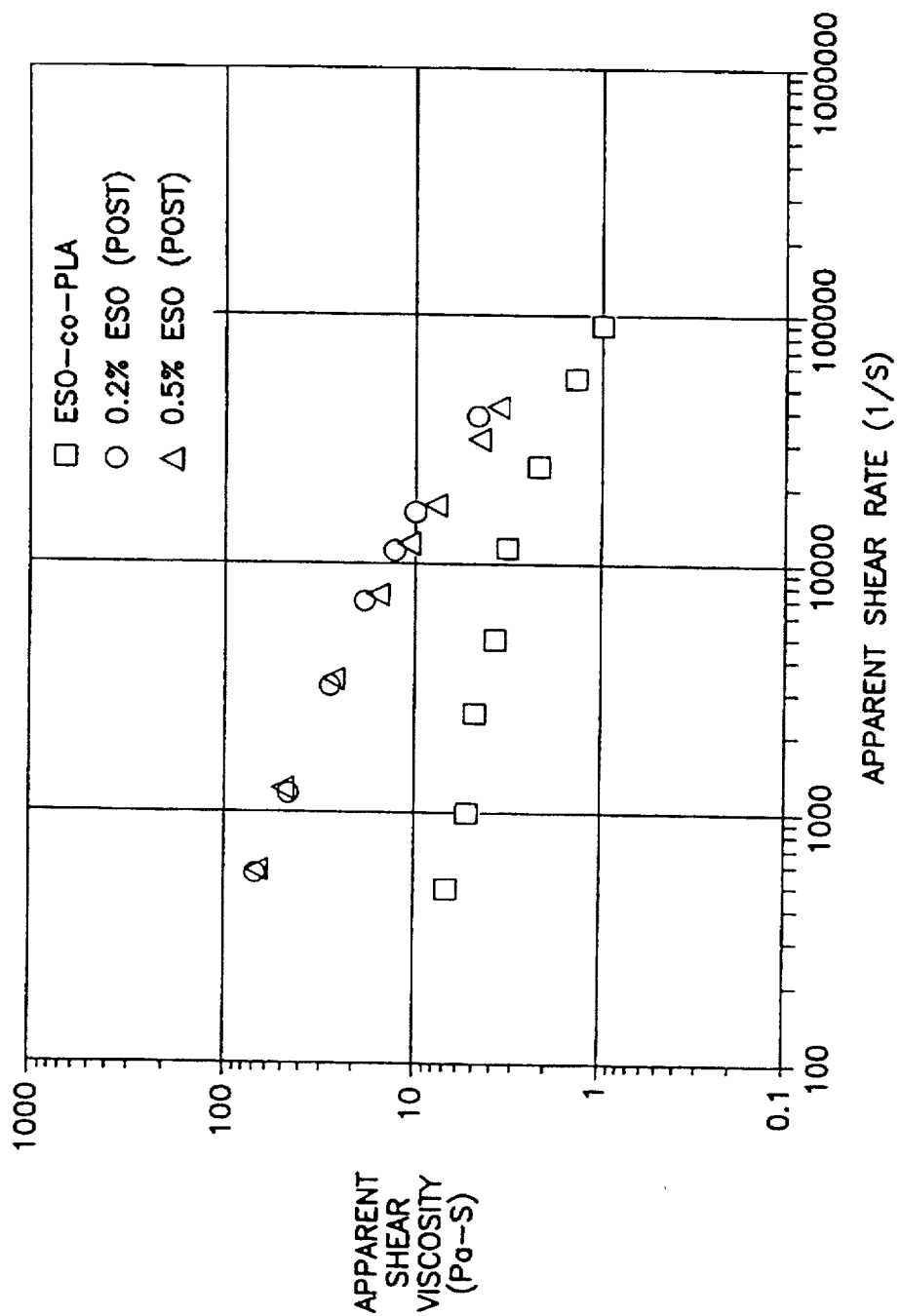
FIG. 3 is a graph of the apparent shear viscosity of three PLA polymers with respect to the apparent shear rate at a temperature of 175 degrees Celsius.
Figure 4:
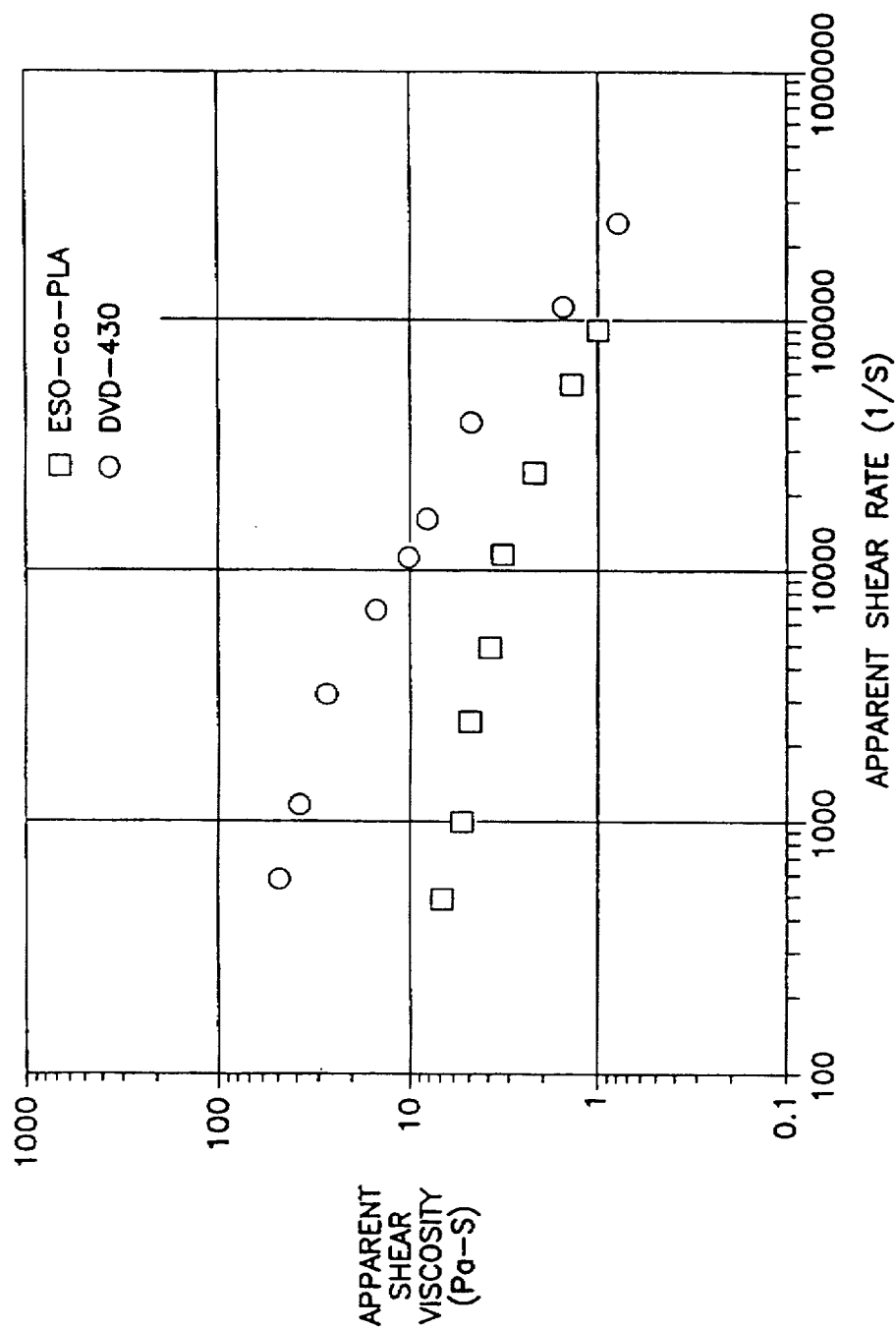
FIG. 4 is a graph of the apparent shear viscosity of two PLA polymers with respect to the apparent shear rate at 175 degrees Celsius.

Results of the capillary viscosity testing at 175° C. are shown in FIGS. 3 and 4. The copolymer is seen to have a dramatically lower apparent shear viscosity. The lower shear viscosity at higher weight average molecular weight is surprising, but is consistent with the reduced die pressure observed when processing the epoxidized oil copolymers in Examples 4 and 9.

Example 18

Screw Sticking Evaluation

An injection molding machine was set at 350° F., and the screw was filled with a test polymer. The test polymer was allowed to sit in the screw for 2 minutes and then it was extruded at 500 psi. The actual rpm of the screw was monitored as the material was extruded. In the absence of sticking, a maximum of 150 rpm was achieved. For base poly(lactide) (or linear non-functionalized polylactide) these conditions can result in a screw which will not turn at all, due to sticking. The following table presents the results of testing the polymers from Example 17.

| Sample | Screw speed (rpm) |
|---|---|
| Base poly(lactide) | 5–15 |
| Base + 0.2% ESO | 2–15 |
| Base + 0.5% ESO | 1–15 |
| Copolymer of lactide/ESO | 135–152 |

The table shows that, when processing the copolymer, the injection molder screw developed the full rpm—indicating less tendency to stick. This is a surprising and significant processing benefit of the epoxidized oil copolymer. This benefit is not obtained from a simple mixture of base poly(lactide) and epoxidized oil.

What is claimed is:

1. A polymer composition comprising:
   (a) a melt processable polylactide polymer comprising:
      (i) repeating units, wherein a majority of the repeating units comprise lactic acid residues; and
      (ii) epoxidized soybean oil residue in an amount resulting from providing a reaction mixture comprising 0.1 to 1.0% by weight, based on total weight of polylactide polymer forming units, of epoxidized soybean oil.

2. A polymer composition according to claim 1, wherein the polymer has a number average molecular weight in the range of about 50,000 to about 150,000.

3. A polymer composition according to claim 1, wherein the polymer has a polydispersity index of at least 2.5.

4. A polymer composition according to claim 1, wherein the polymer is provided in a composition containing not more than 2 percent by weight lactide, based on the weight of the composition.

5. A polymer composition according to claim 1, wherein the polymer is provided in a composition containing not more than 1 percent by weight lactide, based on the weight of the composition.

6. A polymer composition according to claim 1, wherein the polymer is provided in a composition containing not more than 0.5 percent by weight lactide, based on the weight of the composition.

7. A polymer composition according to claim 5, further comprising a plasticizing amount of a plasticizer having a vapor pressure of less than about 10 mm Hg at 170° C.

8. A polymer composition according to claim 1, wherein the plasticizer is selected from the group comprising allyl phosphate esters, dialkylether diesters, tricarboxylic esters, epoxidized oils, epoxidized esters, polyesters, polyglycol diesters, alkyl, allyl ether diesters, aliphatic diesters, alkylether monoesters citrate esters, dicarboxylic esters, vegetable oils, and esters of glycerine.

9. A polymer composition according to claim 7, wherein the plasticizer is selected from the group comprising tricarboxylic esters, citrate esters, esters of glycerine, and dicarboxylic esters.

10. A polymer composition according to claim 11, wherein said polymer comprises a copolymer of lactide monomer and at least one other material.

11. A polymer composition according to claim 10, wherein said at least one other material includes a cyclic ester monomer other than lactide.

12. A polymer composition according to claim 11, wherein said at least one other material includes a cyclic ester monomer other than lactide selected from the group consisting of: dioxanones; lactones; dioxan(dione)s; and ester-amides.

13. A polylactide polymer composition comprising:
   (a) polylactide polymer having repeating units, wherein a majority of the repeating units are lactic acid residues;
   (b) lactide, if present at all, present in concentration of less than 2% by weight based on the weight of the composition;
   (c) said polylactide polymer having a number average molecular weight between about 50,000 and about 150,000; and
   (d) said polylactide polymer is a product of reaction with peroxide by providing a molar ratio of peroxide to polylactide polymer of greater than 0.01:1.

14. A polylactide polymer composition according to claim 13, wherein said polylactide polymer is a product of reaction with peroxide by providing a molar ratio of peroxide to polylactide polymer of between about 0.05:1 and about 3:1.

15. A polylactide polymer composition according to claim 13, wherein the polylactide polymer is prepared by compounding polylactide polymer and peroxide.

16. A polylactide polymer composition according to claim 13, wherein said peroxide is selected from the group consisting of: 2,5-dimethyl-2,5-di(t-butylperoxy) 3-hexyne; 2,5-dimethyl-2,5-di(t-butylperoxy) hexane; 2,5-dimethyl-2,5-di(t-amylperoxy)hexane; 4(t-butylperoxy)-4-methyl-2-pentanol; Bis(t-butylperoxyisopropyl) benzene; dicumyl peroxide; ethyl 3,3-bis(t-butylperoxy) butyrate; ethyl 3,3-bis(t-amylperoxy) butyrate; and, dibenzoyl peroxide.

17. A polylactide polymer composition according to claim 13, wherein said peroxide comprises 3,3-di-(t-butylperoxy)-butyrate.

18. A polylactide polymer composition according to claim 13, further comprising a paper substrate, and wherein the polylactide polymer coats the paper substrate.

19. A polylactide polymer composition according to claim 13, wherein the polylactide polymer composition is a foam.

20. A polymer composition comprising:

(a) a copolymer of lactide monomer and at least one other material;
  (i) said copolymer having a polydispersity index of at least 2.9;
  (ii) said lactide monomer being from the group consisting of: L-lactide, D-lactide, mesolactide and mixtures thereof.

21. A polymer composition according to claim 20, including:

(a) plasticizer having a vapor pressure of less than about 10 mm Hg at 170° C.

22. A polymer composition according to claim 20, wherein:

(a) said at least one other material includes a cyclic ester monomer other than lactide.

23. A polymer composition according to claim 20, wherein:

(a) said at least one other material includes a cyclic ester monomer other than lactide selected from the group consisting of: dioxanones; lactones; dioxan(dione)s and ester-amides.

24. A polymer composition according to claim 20, comprising:

(a) a copolymer of lactide monomer and epoxidized oil.

25. A polymer composition according to claim 24, wherein:

(a) said epoxidized oil is selected from the group consisting of epoxidized linseed oil and epoxidized soybean oil.

26. A polymer composition according to claim 25, wherein:

(a) said copolymer of lactide and epoxidized oil results from polymerizing a mixture containing 0.1–2.0%, by wt., of the epoxidized oil.

27. A polymer composition according to claim 20, wherein:

(a) said polymer composition is peroxide modified by compounding with a peroxide.

28. A polymer composition according to claim 1, wherein:

(a) said polymer composition is peroxide modified by compounding with a peroxide, wherein the molar ratio of peroxide to polymer is between about 0.05:1 to 3:1.

* * * * *

UNITED STATES PATENT AND TRADEMARK OFFICE
CERTIFICATE OF CORRECTION

PATENT NO. : 5,798,435
DATED : August 25, 1998
INVENTOR(S) : Gruber et al.

It is certified that error appears in the above-identified patent and that said Letters Patent is hereby corrected as shown below:

Column 28,
Line 14, "U.S. application Ser. No. 07/955,690" should read -- U.S. Pat. No. 5,338,822 --

Column 42, claim 10,
Line 44, "according to claim 11" should read -- according to claim 1 --

Column 44, claim 27,
Line 28, "peroxide modified by" should read -- a product of --

Column 44, claim 28,
Line 31, "peroxide modified by" should read -- a product of --

Signed and Sealed this

Fourth Day of December, 2001

Attest:

NICHOLAS P. GODICI
Attesting Officer    Acting Director of the United States Patent and Trademark Office

UNITED STATES PATENT AND TRADEMARK OFFICE
CERTIFICATE OF CORRECTION

PATENT NO. : 5,798,435
DATED : August 25, 1998
INVENTOR(S) : Gruber et al.

It is certified that error appears in the above-identified patent and that said Letters Patent is hereby corrected as shown below:

Column 28,
Line 11, "U.S. Patent No. 5,338,822" should read -- U.S. Patent No. 5,475,080 --

Column 42,
Line 33, "according to claim 1" should read -- according to claim 7 --

Column 44,
Line 30, "according to claim 1" should read -- according to claim 27 --

Signed and Sealed this

Twenty-seventh Day of August, 2002

*Attest:*

*Attesting Officer*

JAMES E. ROGAN
*Director of the United States Patent and Trademark Office*